US010710761B2

(12) United States Patent
McNestry et al.

(10) Patent No.: US 10,710,761 B2
(45) Date of Patent: Jul. 14, 2020

(54) LABELLING MACHINE AND METHOD FOR ITS OPERATION

(71) Applicant: VIDEOJET TECHNOLOGIES INC., Wood Dale, IL (US)

(72) Inventors: Martin McNestry, Heanor (GB); Keith Buxton, Nottingham (GB)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 15/558,493

(22) PCT Filed: Mar. 16, 2016

(86) PCT No.: PCT/GB2016/050709
§ 371 (c)(1),
(2) Date: Sep. 14, 2017

(87) PCT Pub. No.: WO2016/146997
PCT Pub. Date: Sep. 22, 2016

(65) Prior Publication Data

US 2018/0079545 A1 Mar. 22, 2018

(30) Foreign Application Priority Data

Mar. 16, 2015 (GB) .................................. 1504379.7

(51) Int. Cl.

| | |
|---|---|
| ***B32B 41/00*** | (2006.01) |
| ***B65C 9/00*** | (2006.01) |
| ***B65C 9/44*** | (2006.01) |
| ***B65C 9/18*** | (2006.01) |
| ***B65C 9/46*** | (2006.01) |

(52) U.S. Cl.
CPC .......... *B65C 9/0006* (2013.01); *B65C 9/1892* (2013.01); *B65C 9/44* (2013.01); *B65C 9/46* (2013.01)

(58) Field of Classification Search
CPC ....... B65C 9/0006; B65C 9/46; B65C 9/1892; B65C 9/44
USPC ........................... 156/64, 350, 351, 378, 379
See application file for complete search history.

(56) References Cited

U.S. PATENT DOCUMENTS

| | | | |
|---|---|---|---|
| 3,425,346 | A | 2/1969 | Voight |
| 4,019,935 | A | 4/1977 | Harvey |
| 5,587,043 | A | 12/1996 | Hying |

FOREIGN PATENT DOCUMENTS

| | | | | |
|---|---|---|---|---|
| GB | 2507743 | A * | 5/2014 | ............ B41J 3/4075 |
| WO | 200000397 | A2 | 1/2000 | |
| WO | 2008107058 | A1 | 9/2008 | |

* cited by examiner

*Primary Examiner* — Michael N Orlando
*Assistant Examiner* — Joshel Rivera
(74) *Attorney, Agent, or Firm* — Beusse, Wolter, Sanks & Maire PLLC; Robert L. Wolter

(57) ABSTRACT

A gap sensor assembly for a labelling machine, the labelling machine configured to convey label web along a web path. The gap sensor assembly comprises a roller configured to guide the label web along the web path, and a sensor arrangement configured to produce a sensor signal which is a function of a property of a portion of label web. The roller comprises at least a portion of the sensor arrangement.

21 Claims, 11 Drawing Sheets

LABELLING MACHINE AND METHOD FOR ITS OPERATION

The present invention relates to a labelling machine and particularly to a labelling machine for use with label stock comprising a web and a plurality of labels attached to the web and which are separable from the web. Such machines are sometimes referred to as "roll-fed self-adhesive labelling machines".

A label stock comprising a web carrying labels is usually manufactured and supplied as a wound roll (hereinafter referred to as a spool). For a given spool, all the labels are typically the same size, within manufacturing tolerances. However, in some instances, this is not the case.

Labels are commonly used to display information relating to an article and are commonly disposed on the article such that the information is easily readable either manually or automatically. Such labels may, for example, display product information, barcodes, stock information or the like. Labels may be adhered to a product or to a container in which the product is packaged.

Some known labelling machines apply pre-printed labels to an article. Such labelling machines may be referred to as label applicator machines. Other known labelling machines print information onto labels immediately before printed labels are applied to an article. Such labelling machines may be referred to as print and apply labelling machines.

It is desirable to be able to advance a web of labels to be applied to an article accurately, so as to ensure that print is accurately positioned on the label (in the case of a print and apply labelling machine) and/or to ensure that the label is accurately positioned on the article. This may be particularly important in print and apply labelling machines in which printing is typically carried out while the label moves relative to the printhead, making accurate control of the label (and hence the label stock) important if printing is to be properly carried out such that the desired information is correctly reproduced on the label.

A known labelling machine comprises a tape drive which advances the label stock from a supply spool support to a take up spool support. The tape drive has a capstan roller of known diameter which is accurately driven to achieve desired linear movement of the label stock along the web path. This capstan roller is also often referred to as a drive roller. The label stock is often pressed against the capstan roller by a nip roller, in order to mitigate risk of slip between the capstan roller and the label stock. For the reliable running of such machines the nip/capstan mechanical arrangement is designed so as to ensure respective axes of the two rollers are substantially parallel to one another and so that the pressure exerted by the nip roller (which is typically spring loaded) is generally even across the width of the label carrying web. This often results in relatively expensive and complex mechanical arrangements, and it is often a time consuming process to load the machine with a supply spool of label stock and feed the label stock from the supply spool support to the take-up spool support, through the nip/capstan rollers, before the labelling machine is operated. This is because the nip roller has to be temporarily disengaged or removed to allow the web of the label stock to be positioned along the web path between the supply spool support and the take up spool support. The nip roller is then repositioned such that the label stock is pressed against the capstan roller by the nip roller and the web of the label stock can be moved between the spool supports by rotation of the capstan roller.

Known tape drives of labelling machines have mechanisms for achieving appropriate drive of the take-up spool including so-called slipping clutch arrangements. The take-up spool support may either driven by an independent drive means, such as a variable torque motor, or driven via a pulley belt and gears from a motor driving the capstan roller.

Tape drive mechanisms which rely upon capstan rollers add cost and complexity to the labelling machine, and have the disadvantages referred to above.

Another known problem associated with nip/capstan roller arrangements of the type described above is that the pressure exerted by the nip roller onto the web and against the capstan roller can cause label adhesive to "bleed" out, over time, from the edges of the label. This adhesive can eventually build up on the capstan or nip rollers. This adhesive can then cause the label stock to stick to the rollers such that it is not transported properly along the desired web path. Furthermore, it is common for labels to be accidentally removed from the web and become attached to the capstan roller or nip roller, impeding proper operation of the labelling machine.

It is therefore desirable in the manufacturing industry for there to be means and a method for transporting a label stock and applying labels from the web of the label stock to a product or container, which is accurate, reliable, simple to use and adaptable to different applications.

Some known labelling machines include a gap sensor for providing an indication of the position of a label of the label stock along the web path. For example, the gap sensor may provide a signal which is indicative of a label on the label web being located adjacent the gap sensor. The signal may be used to control the labelling machine so as to advance the label stock to a desired location. Known gap sensors have several disadvantages. First, due to the characteristics of the gap sensor, the accuracy with which the labelling machine can advance the label stock to the desired location may be impaired. Secondly, due to the structure of the gap sensor and other components of the labelling machine it may be difficult to 'web up' the labelling machine (i.e. install label stock between the supply spool support and take up spool support).

It is an object of embodiments of the present invention to obviate or mitigate one or more of the problems of known gap sensors and/or labelling machines whether set out above or otherwise, and/or to provide an alternative gap sensor and/or labelling machine.

According to a first aspect of the invention there is provided a gap sensor assembly for a labelling machine, the labelling machine configured to convey label web along a web path, the gap sensor assembly comprising a roller configured to guide the label web along the web path; a sensor arrangement configured to produce a sensor signal which is a function of a property of a portion of label web; and wherein the roller comprises at least a portion of the sensor arrangement.

As discussed above, the gap sensor assembly comprises a roller and the roller comprises at least a portion of the sensor arrangement. Labelling machines which include rollers which are located in proximity to a gap sensor are known—e.g. where a roller may be located next to a gap sensor. This situation is different to that of the present invention—these known rollers do not comprise a portion of a sensor arrangement of the gap sensor assembly. That is to say, the known rollers are not in any way integrated with a portion of the sensor arrangement. For example, the roller does not form part of or contain part of the sensor arrangement, the sensor arrangement being that which is configured to produce a sensor signal which is a function of a property of a portion of label web.

The sensor signal may be any appropriate signal—it may, for example, be electrical, acoustic or electromagnetic radiation.

The property of a portion of the label web may be a periodic property. For example it may be a property which varies periodically due to the periodic nature of the labels located along the label web. The property may be a property which varies periodically due to the spacings between adjacent labels located along the label web. The property may be a property which varies as a function of the transition between a portion of label web which does not have a label attached to it and a portion of label web which does have a label attached to it; or as a function of the transition between a portion of label web which has a label attached to it and a portion of label web which does not have a label attached to it. Such transitions may occur at a label edge.

The label web may include the label backing web and attached labels. The label web may also be referred to as label stock.

The sensor arrangement may comprise a transmitter portion configured to produce a detection signal; and a receiver portion configured to detect the detection signal and to produce the sensor signal which is a function of a property of a portion of label web. The roller may comprise the transmitter portion and/or the receiver portion.

The transmitter portion may comprise a first electrode and the receiver portion may comprise a second electrode. Both the first and second electrodes may be located on the roller.

The first and second electrodes may be used to measure the electrical conductivity of a portion of the label stock.

The first and second electrodes may be used to measure a capacitance. The capacitance of a capacitor including the first and second electrodes and the volume between the first and second electrodes, will depend on, amongst other things (including the geometry of the first and second electrodes), the dielectric constant of the material in the volume between the first and second electrodes. Because the volume between the first and second electrodes is likely to include more than one material (e.g. air, the material of the backing web and the material of the labels attached to the backing web), the dielectric constant of the material in the volume between the first and second electrodes can be thought of as having a generalised dielectric constant which is affected by the dielectric constants of each of the individual dielectric constants of the various materials in the volume between the first and second electrodes and the thickness of each of the various materials between the electrodes.

The theory as to how the geometry of the electrodes, the dielectric constants of the material(s) in the portion between the electrodes and the relative thicknesses of the material(s) in the portion between the electrodes affects the capacitance of a capacitor has been well understood for decades and so will not be set out here. However, it will be readily appreciated by a person skilled in the art that, due to different properties of a portion of label web to which a label is attached as compared to a portion of label web to which no label is attached (such as, for example, a difference in total thickness of the label web and/or the presence of a label material which has a different dielectric constant to that of the backing web), as the label web passes between the first and second electrodes of a capacitor, the capacitance of the capacitor will change based on what portion of the label web is between the first and second electrodes. This change in capacitance can readily be measured using conventional electronic circuitry to produce said sensor signal which is a function of a property of a portion of label web. The electrodes in combination with the electronic circuitry which measures the change in capacitance to produce a sensor signal may be referred to as a capacitive sensor.

The transmitter portion may comprise an electromagnetic radiation source configured to produce the detection signal in the form of detection radiation. The receiver portion may comprise an electromagnetic radiation detector configured to detect the detection radiation. The transmitter portion and receiver portion may be configured such that, in use, a portion of the label web passes therebetween. The roller may comprise one of the transmitter portion and the receiver portion, and the other of the transmitter portion and the receiver portion may be separate from the roller.

The roller may comprise a radiation source which forms at least part of the exterior surface of the roller. Alternatively, the roller may comprise a radiation detector which forms at least part of the exterior surface of the roller.

One of the transmitter portion and the receiver portion may be located inside the roller, and the other of the transmitter portion and the receiver portion may be separate from the roller. The roller may be transparent to the detection signal such that the detection signal can pass through the roller.

The roller may be a transparent cylinder. Alternatively, only part of the cylinder may be transparent. For example, the roller may include a window. The roller may be substantially completely transparent to the detection signal such that the majority of the detection signal passes through the roller. Alternatively, the roller may be only partially transparent to the radiation signal such that only part of the detection signal passes through roller.

The transmitter portion may comprise a plurality of electromagnetic radiation sources.

The plurality of electromagnetic radiation sources may be arranged in a substantially linear formation.

The receiver portion may comprise a plurality of electromagnetic radiation detectors.

The plurality of electromagnetic radiation detectors may be arranged in a substantially linear formation.

Each radiation source and each radiation detector may form a sensor pair. That is to say, each radiation source may form a sensor pair with a corresponding radiation detector.

In some embodiments the transmitter portion may include all the radiation sources and the receiver portion may include all of the radiation detectors. In such embodiments, the radiation source of any sensor pair is part of the transmitter portion and the radiation detector of any sensor pair is part of receiver portion.

In other embodiments, the transmitter portion 50*a* may include at least one radiation source, each of the at least one radiation source forming a sensor pair with a corresponding radiation detector of the receiver portion 52*a*. In addition, within such embodiments, the transmitter portion may also include at least one radiation detector, each of the at least one radiation detector forming a sensor pair with a corresponding radiation source which forms part of the receiver portion. That is to say, in some embodiments the transmitter portion may include one or more radiation detectors as well as the one or more radiation sources. Likewise, in such embodiments the receiver portion may include one or more radiation sources as well as the one or more radiation detectors.

The property of the portion of label stock may be the electromagnetic transmittance of the portion of label stock.

The property of the portion of label stock may be the electromagnetic reflectance of the portion of label stock.

The portion of the label stock may comprise the web and attached labels. The portion of the label stock may be the label backing web from which labels have been detached.

The detection signal may be infrared radiation.

According to a second aspect of the invention there is provided a labelling machine comprising a gap sensor arrangement according to the first aspect of the invention, a supply spool support for supporting a supply spool comprising label stock comprising a web and a plurality of spaced labels attached to the web and which are separable from the web; a take-up spool support adapted to take up a portion of web; a motive apparatus configured to propel the web along a web path from the supply spool support to the take-up spool support; and a controller.

The controller may be configured to control the motive apparatus based upon a change in the sensor signal in order to position a target portion of the label stock at a desired location along the web path.

The target portion of the label stock maybe a leading edge of a label and the desired location along the web path may be an edge of a labelling peel plate configured to separate a label from the label web when the label stock passes the labelling peel plate.

The controller may be configured to detect a feature of the label stock based upon a change in the sensor signal.

The feature of the label stock may be selected from the group consisting of: a length of a portion of the label stock, the presence of a label of the label stock, the absence of a label of the label stock, the leading edge of a label of the label stock and the trailing edge of a label of the label stock.

The feature of the label stock may be a length of a portion of the label stock and the length of the portion of the label stock may be selected from the group consisting of a length of a label, a pitch length between adjacent labels and a gap length between adjacent labels.

The motive apparatus may comprise a motor configured to rotate the take-up spool support. Alternatively, the motive apparatus may comprise a motor configured to rotate a platen roller/capstan. The motor in either case may be a DC motor or a stepper motor.

The labelling machine may be arranged to apply pre-printed labels to packages in a product packaging facility.

The labelling machine may further comprise a printer arranged to print onto labels of the label web.

The sensor arrangement may be configured to produce a sensor signal which is a function of a property of a portion of label stock at a plurality of positions spaced from one another in a direction non-parallel to the web path.

Said plurality of positions may be spaced from one another in a direction substantially perpendicular to the web path.

According to a third aspect of the present invention there is provided a labelling machine comprising a supply spool support for supporting a supply spool comprising label stock comprising a web and a plurality of spaced labels attached to the web and which are separable from the web; a take-up spool support adapted to take up a portion of web; a motive apparatus configured to propel the web along a web path from the supply spool support to the take-up spool support; a labelling peel plate configured to separate a label from the label web when the label stock passes the labelling peel plate; and a roller configured to guide the label web upstream of the labelling peel plate along the web path towards the labelling peel plate; wherein the roller extends along a first longitudinal axis from a first end to a second end, the first longitudinal axis being substantially perpendicular to the web path past the roller, wherein the labelling peel plate extends along a second longitudinal axis from a first end to a second end, the second longitudinal axis being substantially perpendicular to the web path past the labelling peel plate; and wherein the roller and labelling peel plate are mounted to the labelling machine via a support member, the roller and labelling peel plate being mounted to the support member only at their respective first ends such that the second ends of the roller and labelling peel plate are unsupported such that, in use, the label stock can webbed up around the roller and the labelling peel plate by sliding the label stock adjacent each of the roller and labelling peel plate from the second end towards the first end in a direction substantially parallel to each of the first and second longitudinal axes respectively.

The second ends of the roller and labelling peel plate are unsupported such that they may be considered to be open. That is to say, they enable sliding the label stock adjacent each of the roller and labelling peel plate from the second end towards the first end in a direction substantially parallel to each of the first and second longitudinal axes respectively. In other words, the second ends of the roller and labelling peel plate enable sliding the label stock adjacent each of the roller and labelling peel plate from the second end towards the first end without obstruction.

The labelling machine may further comprise a gap sensor assembly according to the first aspect of the invention wherein the roller of the third aspect of the invention and the roller of the first aspect of the invention may be one and the same.

Any of the features described in relation to the labelling machine above may be applied to the method above.

Although the above-described aspects of the invention relate to a labelling machine and a method of controlling a labelling machine, it will be appreciated that the invention may also be applied to a tape drive and method of controlling a tape drive.

In the case of a label web in which labels are attached to a backing web, the different properties of a portion of label web in which a label is attached to the backing web and a portion of label web in which no label is attached to the backing web, may give rise to distinctive (periodic) features along the label web which can be measured by the gap sensor arrangement.

In the case of a tape driven along a tape path by a tape drive, the tape may be any appropriate tape. An example of appropriate tape includes print ribbon. When a gap sensor arrangement according to the present invention is used in combination with a tape drive, instead of measuring a gap, as is the case with the gap sensor arrangements discussed above, the gap sensor arrangement may measure any appropriate distinctive feature along the length of the tape. As such, the sensor may produce a sensor signal which is a function of a periodic property of a portion of the tape. For example, the gap sensor arrangement may measure the presence of discrete marks along the length of the tape. The discrete marks may have any appropriate property which is different to that of the rest of the tape. For example, the discrete marks may be of a different colour to the rest of the tape, or the discrete marks may have a different transmission and/or reflection co-efficient with respect to a given type of electromagnetic radiation as compared to that of the rest of the tape. In another example, the tape may not include discrete marks, but may by its nature have a property which varies periodically. For example, the tape may include sections such that each section has a different property (e.g. colour) to those adjacent to it.

Where features have been described above in the context of one aspect of the invention, it will be appreciated that where appropriate such features may be applied to other aspects of the invention. Indeed, any of the features described above and elsewhere herein can be combined in any operative combination and such combination is expressly foreseen in the present disclosure.

To the extent appropriate, control methods described herein maybe implemented by way of suitable computer programs and as such computer programs comprising processor readable instructions arranged to cause a processor to execute such control methods are provided. Such computer programs may be carried on any appropriate carrier medium (which may be a tangible or non-tangible carrier medium).

Specific embodiments of the present invention will now be described, by way of example only, with reference to the accompanying drawings, in which:

FIGS. 1 and 2 show schematic side views of portions of two different types of labelling machine in accordance with the present invention. FIG. 1 shows a labelling machine with no integrated printer (also known as a label applicator) and FIG. 2 shows a labelling machine with an integrated printer (also known as a print and apply labelling machine).

Figure 1:
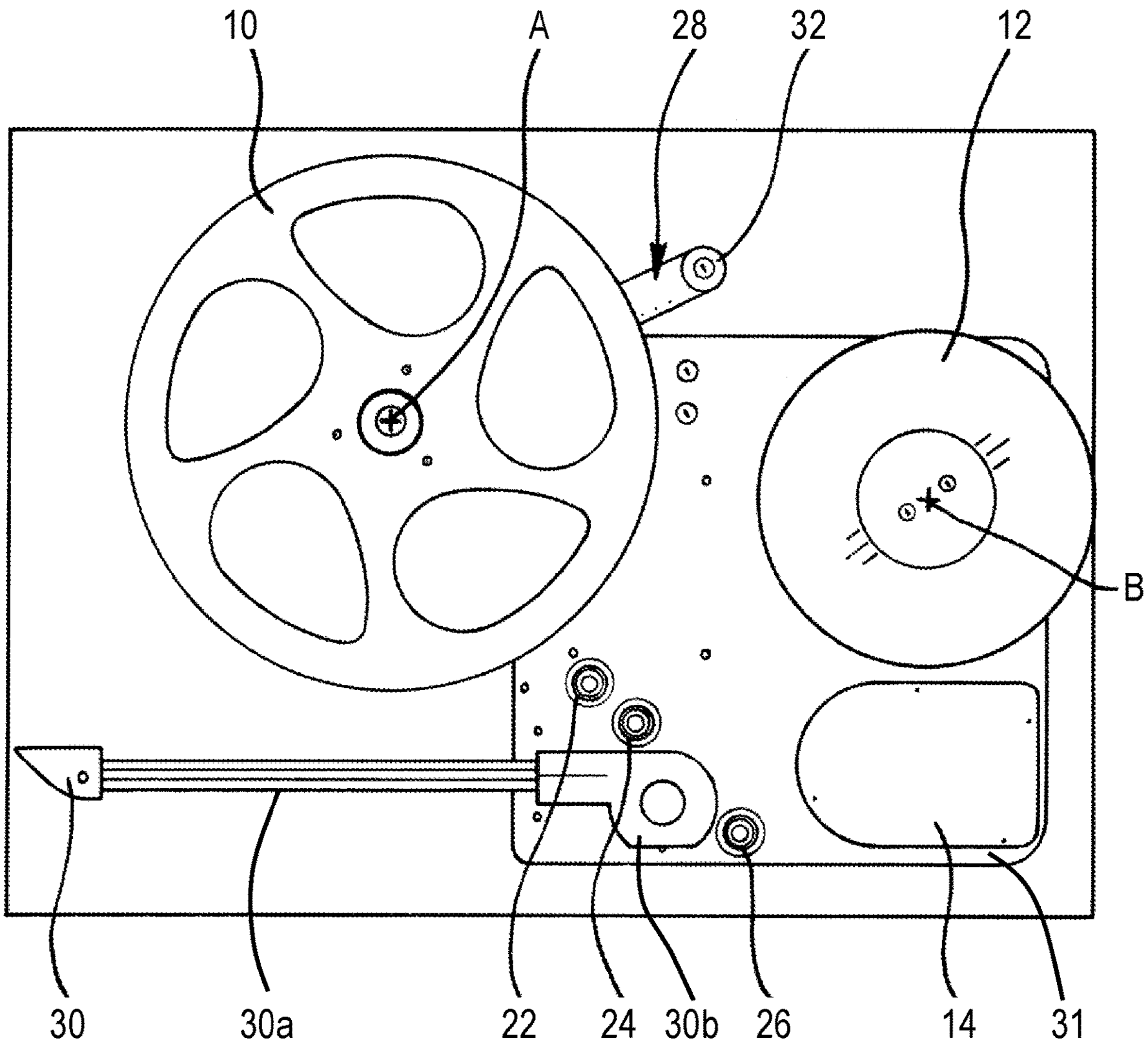
FIG. 1 shows a schematic side elevation of a portion of a labelling machine in accordance with an embodiment of the invention.
Figure 2:
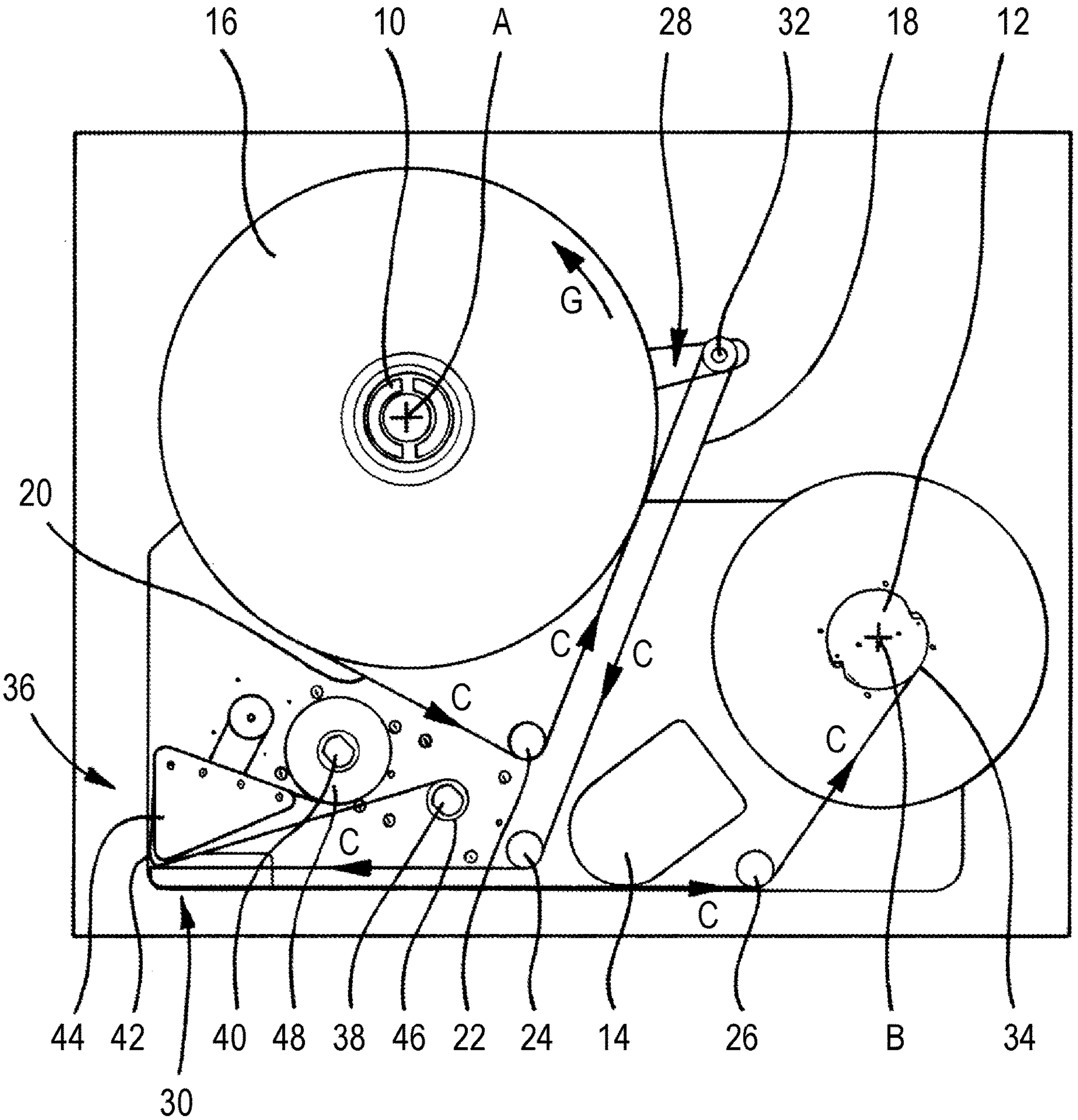
FIG. 2 shows a schematic side elevation of a portion of a labelling machine in accordance with a second embodiment of the invention.

The labelling machines shown in FIGS. 1 and 2 both include a supply spool support 10 and a take up spool support 12. The supply spool support 10 and take up spool support 12 are both mounted for rotation about respective axes A and B. The take up spool is connected to a motor 14 such that the motor 14 can be powered in order to rotate the take up spool 12 about the axis B. In the labelling machines shown in FIGS. 1 and 2, the motor 14 is connected to the take up spool support 12 via a belt (not shown).

In the labelling machine shown in FIGS. 1 and 2 the motor 14 is a stepper motor. An example of a suitable stepper motor is a 34H318E50B stepper motor produced by Portescap, USA. An example of a suitable belt which connects the motor 14 to the take up spool support 12 is a synchroflex timing belt. In this embodiment the gearing ratio for the belt drive is 4:1 whereby the motor revolves four times for every revolution of the take up spool support. It will be appreciated that in other embodiments any appropriate gearing ratio for the belt drive may be used.

In this case the stepper motor is capable of being controlled such that it can execute 1600 substantially equal angular movements per complete rotation of the stepper motor. These substantially equal angular movements may be referred to as micro-steps. Each micro-step is equivalent to a rotation of about 0.225° or about 0.00392 radians. In this case, the stepper motor has 200 steps per revolution, but the stepper motor is controlled to produce 8 micro-steps per step, such that the number of micro-steps per revolution is 1600. Because the belt drive gearing ratio is 4 to 1, the number of micro steps of the motor per revolution of the take up spool support is 6400. Stepper motors are generally driven by a stepper motor driver. In the case of the motor and control arrangement described above, if the stepper motor driver is commanded to advance one step, the stepper motor driver will provide a signal to the stepper motor which causes the stepper motor to rotate by one micro-step (i.e. about) 0.225°. It will be appreciated that in other embodiments, the stepper motor may undertake any appropriate number of steps per complete rotation of the stepper motor, and the stepper motor may be controlled to produce any appropriate number of micro-steps per step of the stepper motor. Furthermore, the belt drive gearing ratio may be chosen such that the number of micro steps of the motor per revolution of the take up spool support is any appropriate desired number.

While the term ‘step’ is sometimes used to denote a physical property of a stepper motor, in the present description, the term ‘step’ is used to denote any desired angular movement of the stepper motor, for example a micro-step.

Stepper motors are an example of a class of motors referred to as position-controlled motors. A position-controlled motor is a motor controlled by a demanded output rotary position. That is, the output position may be varied on demand, or the output rotational velocity may be varied by control of the speed at which the demanded output rotary position changes. A stepper motor is an open loop position-controlled motor. That is, a stepper motor is supplied with an input signal relating to a demanded rotation position or rotational velocity and the stepper motor is driven to achieve the demanded position or velocity.

Some position-controlled motors are provided with an encoder providing a feedback signal indicative of the actual position or velocity of the motor. The feedback signal may be used to generate an error signal by comparison with the demanded output rotary position (or velocity), the error signal being used to drive the motor to minimise the error. A stepper motor provided with an encoder in this manner may form part of a closed loop position-controlled motor.

An alternative form of closed loop position-controlled motor comprises a DC motor provided with an encoder. The output from the encoder provides a feedback signal from which an error signal can be generated when the feedback signal is compared to a demanded output rotary position (or velocity), the error signal being used to drive the motor to minimise the error. A DC motor which is not provided with an encoder is not a position-controlled motor.

It will be appreciated that in labelling machines other than those shown in FIGS. 1 and 2, the motor may take any convenient form. For example, the motor may be any appropriate open or closed loop position-controlled motor.

When the labelling machines shown in FIGS. 1 and 2 are in use, a supply spool of label stock may be mounted to the supply spool support such that the supply spool support 10 supports the supply spool. The label machine shown in FIG. 1 does not have a supply spool mounted to the supply spool support 10. However, the labelling machine shown in FIG. 2 does have a supply spool 16 mounted to the supply spool support 10. The supply spool 16 is mounted to the supply spool support 10 such that the supply spool 16 co-rotates with the supply spool support 10.

As can be seen best in FIG. 2, in use, label stock 18 extends between the supply spool support 10 (and in particular the supply spool 16 mounted to the supply spool support 10) and the take up spool support 12. A web path 20 is defined between the supply spool support 10 and take up spool support 12 by various components and, in use, the label stock is transported along the web path 20. In the labelling machines shown in FIGS. 1 and 2, first, second and third rollers (22, 24 and 26) define the web path 20 between the supply spool support 10 and take up spool support 12. It will be appreciated that in other embodiments of the labelling machine, components other than rollers may be used to define the web path 20. Suitable components may be those which impart only a small friction force to label stock when label stock contacts it.

The web path 20 is also defined by a dancing arm 28 and a label applicator assembly 30. The dancing arm 28 includes a dancing arm roller 32 mounted at one end of the dancing arm 28.

In use, the label stock 18 extends along the web path 20 from the supply spool support 10 (and in particular from the supply spool 16) around the first roller 22, around the dancing arm roller 32, around the second roller 24, around the label applicator assembly 30, around the third roller 26 and is wound onto the take up spool support 12 to form a take up spool 34.

It will be appreciated that in other embodiments of a labelling machine according to the invention any appropriate number of rollers (or any other appropriate components) may be used to define a desired shape/length of web path 20.

The dancing arm 28 is a movable element which is rotatable about axis A. That is to say, in the labelling machines shown in FIGS. 1 and 2, the axis of rotation of the dancing arm 38 is coaxial with the axis of rotation of the supply spool support 10 (and the supply spool 16). In other embodiments this need not be the case. For example, the dancing arm 28 may rotate about an axis which is spaced from the axis A of rotation of the supply spool support 10 (and supply spool 16 if attached).

It will also be appreciated that in the labelling machine shown in FIGS. 1 and 2, the dancing arm 28 is a movable element which defines the web path 20 and movement of the dancing arm 28 changes the length of the web path between the supply spool support 10 and take up spool support 12. It will be appreciated that in other labelling machines any other appropriate movable element may be used, providing that movement of the movable element changes the length of the web path between the supply spool support and take up spool support. Other labelling machines according to the present invention may not incorporate a movable element of this sort.

The labelling machine shown in FIG. 2 includes a printer 36 (however, as previously discussed, other embodiments of labelling machine according to the present invention need not include a printer). The printer in this case is a thermal transfer printer. However, it will be appreciated that other embodiments of labelling machine according to the present invention may include any appropriate type of printer, for example, an inkjet printer, a thermal printer or a laser marking system. The printer 36 includes a ribbon supply spool support 38, a ribbon take up spool support 40, a print head 42 and a ribbon guide member 44. The ribbon guide member 44 includes several rollers (not shown) which help to guide the ribbon around the ribbon guide member so that the ribbon passes around the ribbon guide member 44 without catching on it. In use, a spool of printer ribbon is mounted to the ribbon supply spool support 38, such that said spool of printer ribbon constitutes a supply spool 46 of printer ribbon which is supported by the ribbon supply spool support 38.

In use, print ribbon from the supply spool 46 passes along a print ribbon path past the print head 42 and is wound on to the ribbon take up spool support 40 so as to form a take up spool 48. In order for print ribbon to be transported from the ribbon supply spool support 38 to the ribbon take up spool support 40, at least the ribbon take up spool support 40 is connected to a motor such that the motor can rotate the ribbon take up spool support 40.

Because the printer 36 shown in FIG. 2 is a thermal transfer printer, the print ribbon is thermally sensitive such that, as the print ribbon passes the print head 42, at least a portion of the print head 42 can be selectively energised to heat a desired portion of the print ribbon and transfer ink from that portion of the print ribbon to an adjacent substrate. In this case the adjacent substrate is a label that forms part of the label stock 18. During operation of the printer 36, the guide block 44 comprises guide rollers which help to guide the print ribbon as it is transported from the ribbon supply spool support 38 to the ribbon take up spool support 40.

The label stock which is used by either of the labelling machines shown in FIGS. 1 and 2 comprises a web and a plurality of labels attached to the web. The labels attached to the web are separable from the web.

Each of the labelling machines shown in FIGS. 1 and 2 includes a label applicator assembly 30. In the labelling machine shown in FIG. 1 the label applicator assembly is located at one end of an applicator arm 30*a*, the other end of which is secured to a base plate 31 of the labelling machine via an arm holder 30*b*. In the labelling machine shown in FIG. 2 the label applicator assembly 30 is located adjacent the printer 36.

Figure 3:
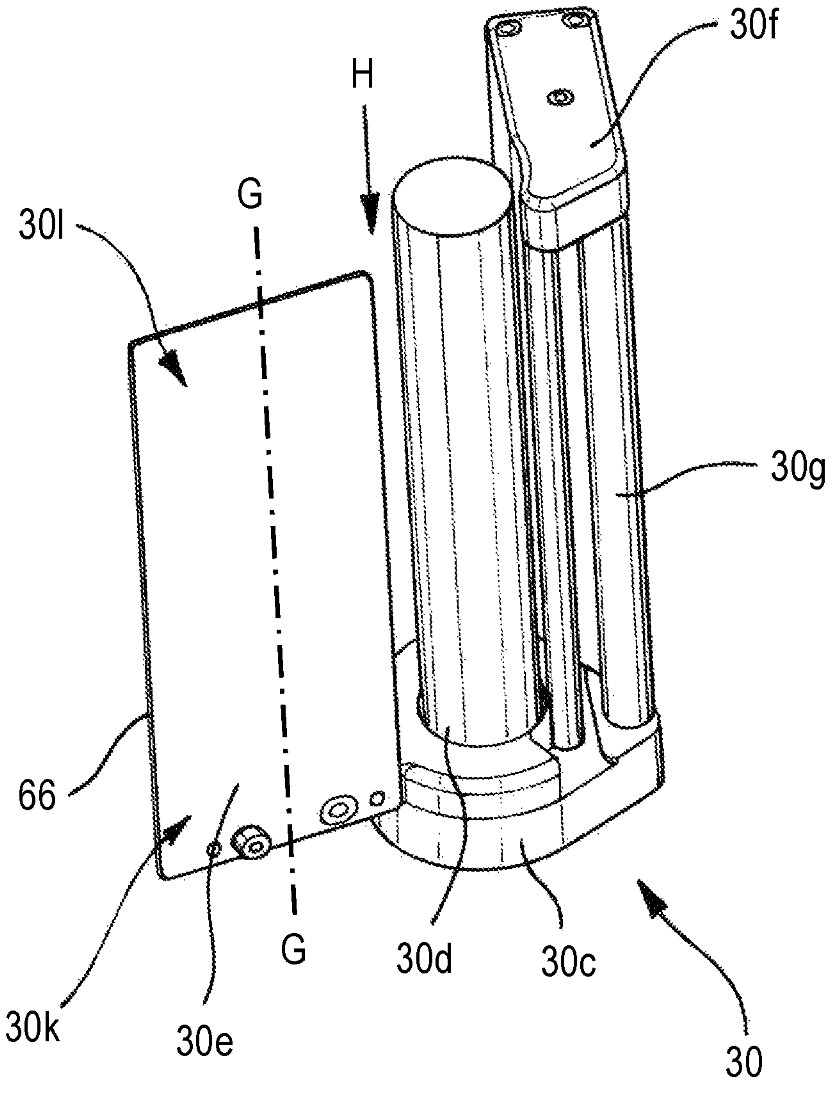
FIG. 3 shows a schematic perspective view of a label applicator assembly in accordance with an embodiment of the present invention.
Figure 4:
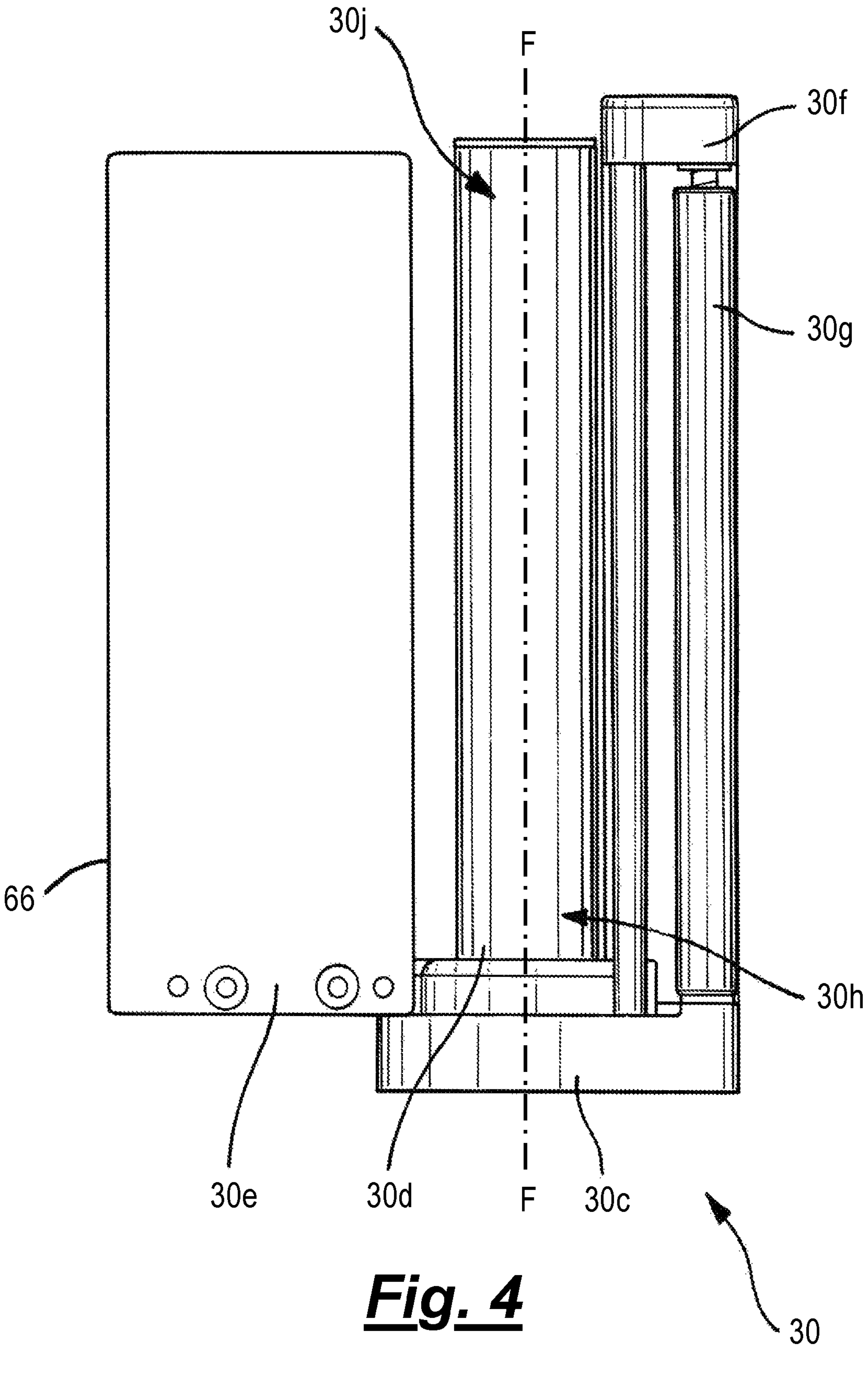
FIG. 4 shows a schematic view from below of the label applicator assembly shown in FIG. 3.
Figure 5:
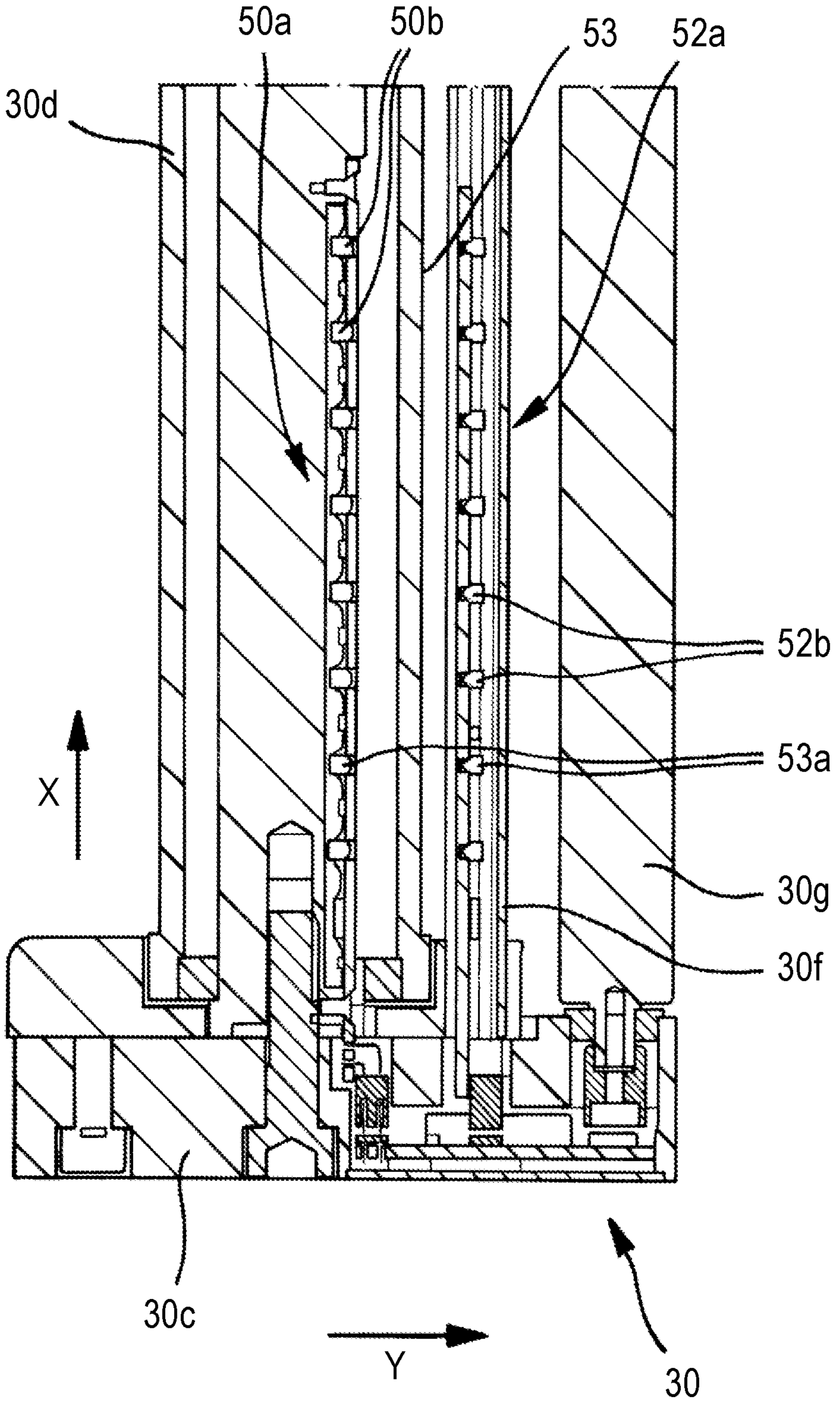
FIG. 5 shows a schematic cross-sectional view of the label applicator assembly shown in FIGS. 3 and 4.
Figure 6:
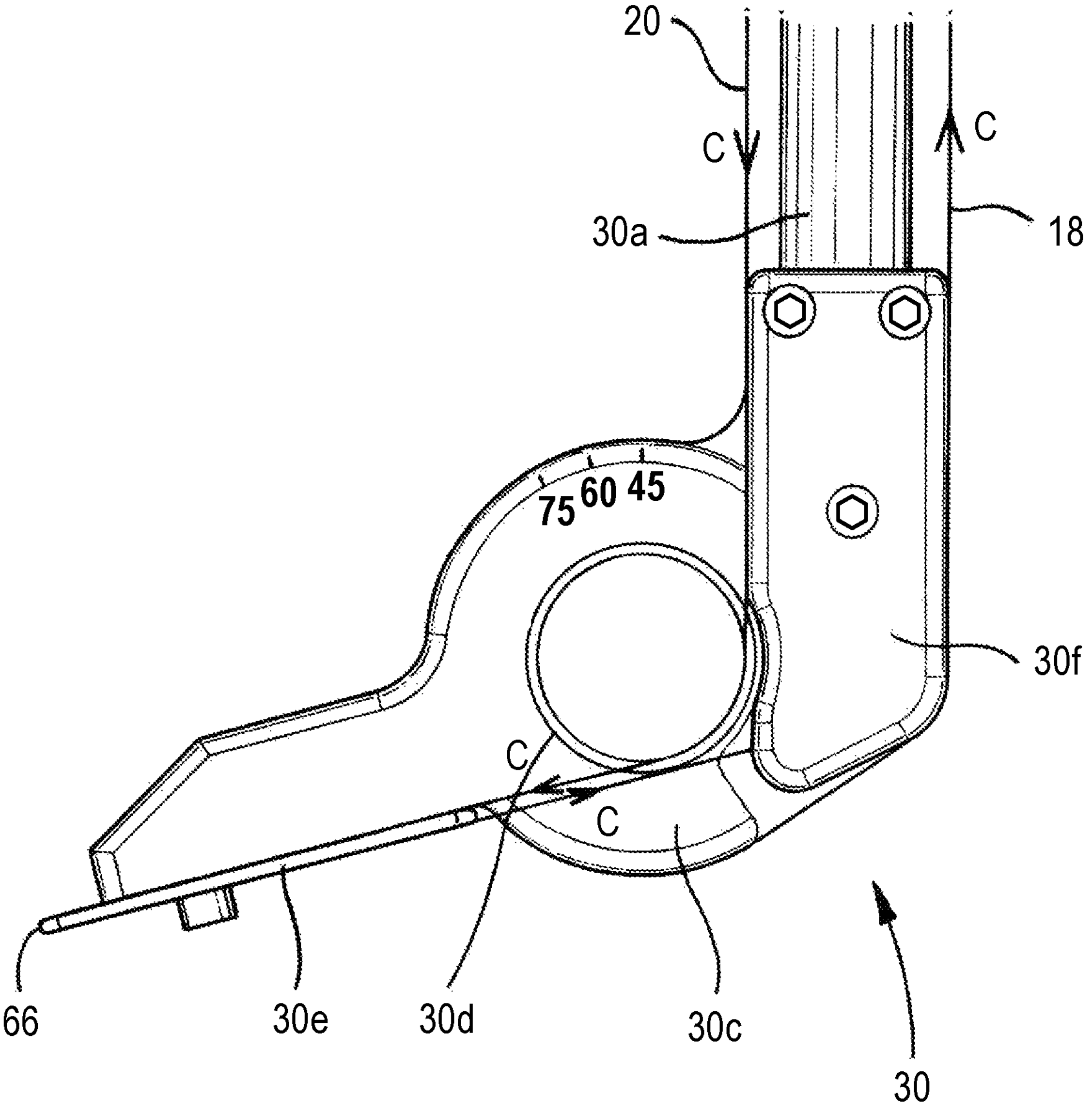
FIG. 6 shows a schematic side view of the label applicator assembly shown in FIGS. 3 to 5 in use.

FIGS. 3 to 6 show various schematic views of the label applicator assembly. FIGS. 3, 4 and 5 show schematic perspective, bottom and cross-sectional views respectively of the label applicator assembly 30. FIG. 6 shows a side view of the label applicator assembly 30 mounted to the applicator arm 30*a* and with label web 18 travelling along the label web path 20 such that it passes around the various components, as will be discussed in more detail below.

The label applicator assembly 30 comprises a support 30*c* to which are mounted a fourth roller 30*d*, a labelling peel plate 30*e*, a sensor housing 30*f* and a fifth roller 30*g*.

The labelling peel plate 30*e* is configured, in use, to separate labels from the label web when the label stock passes the labelling peel plate 30*e* (and, in particular, a label removing edge 66 of the labelling peel plate 30*e*). The fourth roller 30*d* is mounted to the support 30*c* for rotation relative thereto.

As seen best in FIG. 6, the fourth roller 30*d* is configured to engage the label web 18. In more detail, in use, the web path 20 is such that the label stock passes around roller 24 (as seen in FIGS. 1 and 2) and then to the fourth roller 30*d* such that the roller 30*d* guides the label stock along the web path 18. The label stock then passes around the labelling peel plate 30*e* and, in particular, around the edge 66 of the labelling peel plate 30*e* which separates labels of the label stock from the label web. The label web then passes around the fifth roller 30*g* and to the roller 26 (as seen in FIGS. 1 and 2).

As such, in the present embodiment, the roller 30*d* is configured to engage the label web upstream of the labelling peel plate 30*e* and to guide the label web along the web path 20 towards the labelling peel plate 30*e*.

Although the presently described embodiment uses a labelling peel plate in order to separate labels from the label web in order that they may be applied to a desired surface, in other embodiments any appropriate method of separating labels from the label web such that they can be applied to a desired surface may be used.

The roller 30*d* extends along a first longitudinal axis F from a first end 30*h* to a second end 30*j*. The longitudinal axis F is substantially perpendicular to the direction of the web path 20 past the roller 30*d*.

The labelling peel plate 30*e* extends along a second longitudinal axis G from a first end 30*k* to a second end 30*l*. Again, the longitudinal axis G is substantially perpendicular to the direction of the web path 20 past the labelling peel plate 30*e*. As previously discussed, the roller 30*d* and labelling peel plate 30*e* are mounted to the labelling machine via a support 30*c*. The roller 30*d* and labelling peel plate 30*e* are mounted to the support 30*c* only at their respective first ends 30*h*, 30*k* such that the second ends 30*j*, 301 of the roller 30*d* and labelling peel plate 30*e* are unsupported (or open).

Before the labelling machine is used to dispense labels, it is necessary for the machine to be webbed-up. Webbing-up is a well-used term in the art and refers to the process whereby label stock is fitted to the machine before the labelling machine is used to dispense labels. In particular, this process is achieved by mounting a supply spool of label stock to the supply spool support and around each of the components the label web passes as it travels along the web path. In addition, the end of the label stock is secured to the take up spool. In known labelling machines the process of webbing-up the labelling machine has been complicated by a complex label web path and because components which define the web path have been mounted at both ends to a support, it has been necessary to thread the label stock along the web path adjacent the components which define the web path.

In an embodiment of the present invention, because the roller 30*d* and labelling peel plate 30*e* are both mounted to the support 30*c* only at their respective first ends 30*h*, 30*k*, the second ends 30*j*, 301 of the roller 30*d* and labelling peel plate 30*e* are unsupported (or open).

It follows that, because the second ends 30*h*, 301 of the roller 30*d* and labelling peel plate 30*e* are unsupported, a labelling machine according to the present invention can be webbed-up around the roller 30*d* and labelling peel plate 30*e* by sliding the label stock (in a direction substantially perpendicular to the length of the label stock) adjacent each of the roller 30*d* and labelling peel plate 30*e* from the open second ends 30*j*, 301 towards the first ends 30*h*, 30*k* in the direction H, which is substantially parallel to each of the first and second longitudinal axes F, G respectively. This makes webbing-up the labelling machine according to the present invention more straightforward as compared to webbing-up a labelling machine which requires the label stock to be threaded along the web path.

It will be appreciated that within the present embodiment, because the longitudinal axes F and G are substantially parallel to one another, the direction in which the label stock slides when webbing-up the machine is the same adjacent to the roller as it is adjacent the labelling peel plate. However, the embodiments in which the longitudinal axis of the roller is not parallel to the longitudinal axis of the labelling peel plate, the direction in which the label stock slides whilst the labelling machine is webbed-up will be parallel to the longitudinal axis of the roller adjacent the roller and parallel to the longitudinal axis of the labelling peel plate adjacent the labelling peel plate.

As previously discussed, the labelling peel plate 30*e* is configured such that, during operation of the labelling machine, as the label stock 18 is transported along the web path 20 past the labelling peel plate 30*e*, the labelling peel plate 30*e* separates a passing label from the web. The separated label may then be attached to a desired article. An example of such a desired article is an item passing on a conveyor (not shown) of a production line. However, it will be appreciated that the desired article may be any appropriate article. In the case of the labelling machine shown in FIG. 2, prior to the label being attached to a desired article, the printer 36 may print a desired image on the label. In some embodiments the printing may occur prior to the labelling peel plate 30*e* separating the label from the web of the label stock, and in other embodiments the printing of the image may occur after the labelling peel plate 30*e* separates the label from the web of the label stock.

During operation of the labelling machines shown in FIGS. 1 and 2 the motor 14 is energised to rotate the take up spool support 12 about its axis B. As this is done, the take up spool support 12 winds label stock 18 onto the take up spool support 12 to form a take up spool 34. The take up spool 34 will include the web of the label stock. Any labels separated from the web of the label stock as they pass the labelling peel plate 30*e* will not form part of the take up spool 34. In some embodiments the labelling peel plate 30*e* may be configured to selectively separate labels from the web. In this case, any labels which are not separated from the web of the label stock by the labelling peel plate 30*e* will be wound onto the take up spool support 12 and therefore form part of the take up spool 34.

The winding of the label stock 18 (and in particular the web of the label stock) onto the take up spool support 12 will cause the label stock 18 to move along the web path 20 in the direction indicated by arrows C (FIGS. 2 and 6). The winding of the web of the label stock onto the take up spool support 12 causes label stock to be paid out from the supply spool 16 which is supported by the supply spool support 10.

This arrangement, whereby the take up spool support 12 is driven so as to transport the label stock in the direction C of label stock transport, and where the supply spool support 10 is not driven may be referred to as a pull-drag system. This is because, in use, as discussed below, the supply spool support 10 provides some resistance (or drag) to the movement of label web so as to provide tension in the label web. In this case friction within the system provides the drag. For example, the friction may include the friction between the supply spool support and the means which supports the supply spool support for rotation. Drag may also be provided by the inertia of the supply spool. In other embodiments the drag in a pull-drag system may be actively controlled. For example, in one embodiment a DC motor may be attached to the to the supply spool support and may be energised in a direction which is opposite to the direction in which the supply spool support rotates due to label stock being wound off the supply spool support and on to the take up spool support. In this case, the amount of drag that the DC motor provides to the system can be controlled by controlling the current supplied to the motor and therefore the torque applied by the motor.

In other embodiments of the labelling machine, the supply spool support 10 may be driven so that, in use, it rotates the supported supply spool 16. In some embodiments the supply spool support 10 may be driven for rotation in a direction which opposes movement of the label stock in the direction C of label stock transport (which is effected by the rotation of the take up spool support 12). This kind of arrangement is also referred to as a pull-drag system.

In other embodiments the supply spool support 10 may be driven such that it is rotated by a motor in a direction which is complementary to movement of the label stock in the direction C of label stock transport (which is effected by rotation of the take up spool support 12). This type of arrangement may be referred to as a push-pull system. It will be appreciated that in embodiments of the labelling machine which include a driven supply spool support 10, the supply spool support 10 may be driven by any appropriate motor. Examples of such motors include a DC motor or a position-controlled motor such as, for example, a stepper motor.

Figure 7:
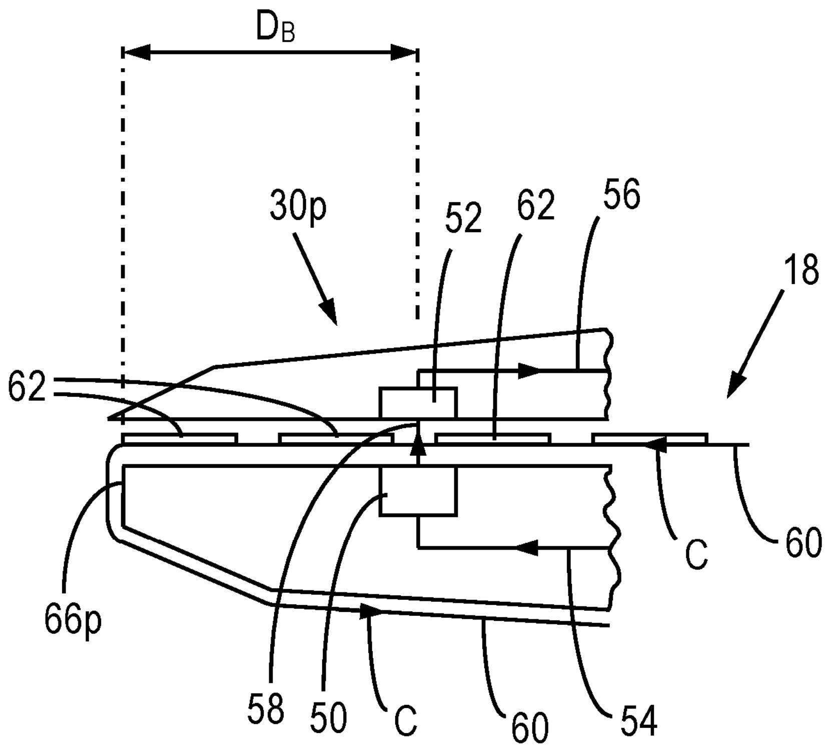
Fig. 7 (Prior Art)
FIG. 7 shows a schematic cross section through a portion of a known label applicator assembly.

FIG. 7 shows a schematic cross-section through a known type of label applicator assembly 30*p* (i.e. not a label applicator assembly according to the present invention) which may form part of a known labelling machine. The label applicator assembly 30*p* includes a label peel beak having an edge 66*p*. The label applicator assembly 30*p* also includes a sensor comprising an electromagnetic radiation source 50 and an electromagnetic radiation detector 52. The electromagnetic radiation source 50 is powered by a power source via a power line 54. The sensor, and in particular the electromagnetic radiation detector 52, is configured to produce a sensor signal 56. The sensor may commonly be referred to as a gap sensor and is generally arranged to produce a sensor signal which differentiates between portions of the web which carry labels and portions of the web that do not.

In use, the electromagnetic radiation source 50 produces a beam 58 of electromagnetic radiation. Label stock 18 comprising a web 60 and a plurality of labels 62 attached to the web (and which are separable from the web) passes between the electromagnetic radiation source 50 and electromagnetic radiation detector 52 as the label stock 18 is transported in a direction C along a web path past the label applicator assembly 30*p*. The beam 58 of electromagnetic radiation which is produced by the electromagnetic radiation source 50 passes through the label stock 18 and is incident on the electromagnetic radiation detector 52. The sensor signal 56 output by the electromagnetic radiation detector 52 is a function of an amount of electromagnetic radiation which is incident on the electromagnetic radiation detector 52. That is to say, the sensor signal 56 output by the electromagnetic radiation detector 52 is a function of the amount of electromagnetic radiation which is produced by the electromagnetic radiation source 50 and which passes through the label stock 18.

Figure 8:
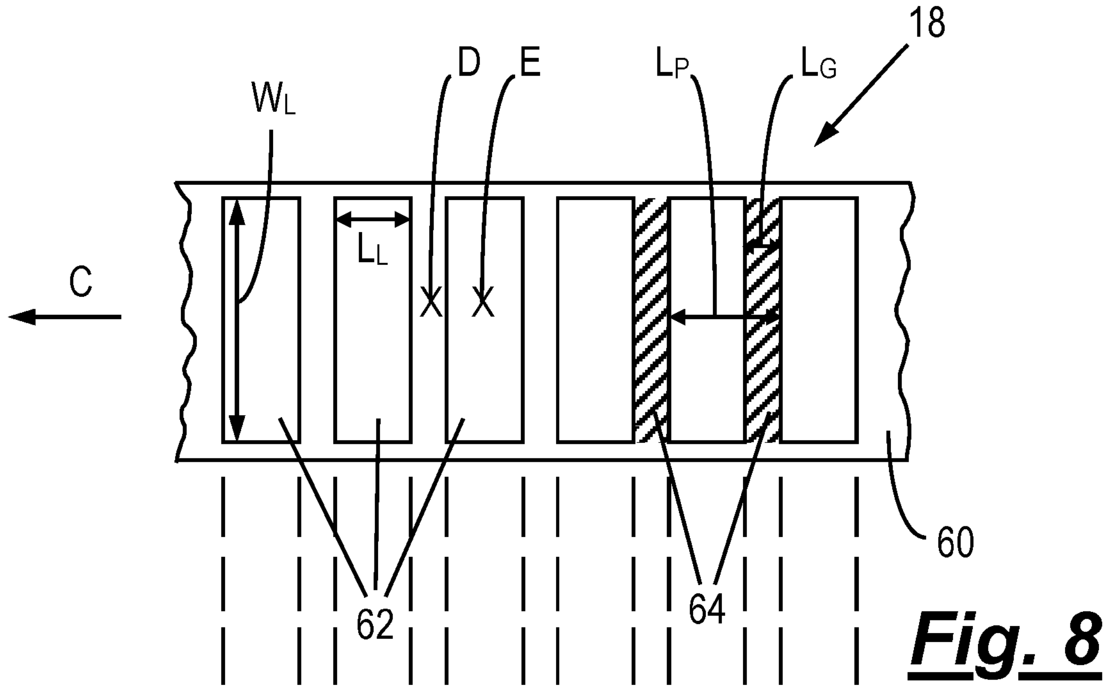
FIG. 8 shows a schematic plan view of a portion of label stock which is utilised in conjunction with a labelling machine.

FIG. 8 shows a schematic plan view of a portion of label stock 18. The portion of label stock 18 shown in FIG. 8 has labels which are all substantially the same size and shape. Other label stock which may be used by the labelling machine may have labels which are of a different size and/or which may have different spacing therebetween. For example, some label stock which may be used by the labelling machine includes two types of label, each type having a different size and/or shape. The label stock may be such that along the length of the label stock the labels alternate between labels of a first type and labels of a second type. It can be seen from FIG. 7 that, when a portion of label stock 18 as shown in FIG. 8 passes between the electromagnetic radiation source 50 and electromagnetic radiation detector 52, the beam 58 of electromagnetic radiation will propagate in a direction which is substantially out the page in FIG. 8. The direction of propagation of the beam 58 of electromagnetic radiation may be substantially perpendicular to the plane of the substantially planar label stock 18.

The electromagnetic transmittance (i.e., what proportion of electromagnetic radiation incident on a material is transmitted through the material) of the web 60 of the label stock will commonly be different to the electromagnetic transmittance of the labels 52 of the label stock 18. Also the electromagnetic transmittance of two different thicknesses of a material will also be different (i.e., the electromagnetic transmittance through a relatively thick material will be less than the electromagnetic transmittance through a relatively thin material). Either of these two factors, or a combination of the two, will result in the electromagnetic transmittance of a portion of the label stock 18 which includes only the web 60 (for example at a position indicated by D, sometimes referred to in the art as a 'gap') will be different to (in this case greater than) the electromagnetic transmittance of a portion of the label stock 18 which includes both the web 60 and a label (for example at a position indicated by E).

When the beam 58 of electromagnetic radiation produced by the electromagnetic radiation source 50 passes through a portion of the label stock with a relatively high electromagnetic transmittance (such as through the label stock 18 at position D within FIG. 4), then the amount of electromagnetic radiation which is incident on the electromagnetic radiation detector 52 will be greater than when compared to the amount of electromagnetic radiation incident on the electromagnetic radiation detector 52 when the beam 58 of electromagnetic radiation produced by the electromagnetic radiation source 50 passes through a portion of the label stock 18 which includes both the web 60 and a label 62 (for example at a position indicated by E in FIG. 8).

Consequently, the sensor signal 56 output by the electromagnetic radiation detector 52 will be different depending on whether the beam 58 of radiation produced by the electromagnetic radiation source 50 passes through a portion of the label stock 18 which has a relatively high transmittance (for example at the position D) or whether the beam 58 of electromagnetic radiation produced by the electromagnetic radiation source 50 passes through a portion of the label stock 18 which has a relatively low electromagnetic transmittance (for example at position E). For example, the sensor signal 56 produced by the electromagnetic radiation detector 52 of the sensor may be a voltage and the voltage may be greater when the beam of electromagnetic radiation 58 passes through a portion of the label stock 18 has relatively high electromagnetic transmittance compared to the voltage when the beam 58 of electromagnetic radiation passes through a portion of the label stock 18 with relatively low electromagnetic transmittance.

Because the label stock 18 will, in use, be transported along the web path in a transportation direction C, it will be appreciated that the beam 58 of radiation will alternate between passing through a portion of the label stock 18 which includes only the web 60 (e.g. as indicated at position D in FIG. 8), and a portion of the label stock 18 which includes the web 60 and a label 62 (e.g. as indicated at position E in FIG. 8). For ease of reference, a portion of label web 60 which has no label attached to it and which is between two adjacent labels 62 may be referred to as a gap. Two such gaps are indicated by shading 64 in FIG. 8.

The label stock 18 includes a plurality of labels 62 which have a label width $W_L$ which is substantially perpendicular to the transportation direction C, and a label length which is substantially parallel to the transportation direction C. The labels are substantially similar as is the gap 64 between adjacent labels. The length of a gap is denoted $L_G$. The pitch length $L_P$ between adjacent labels is the sum of the label length $L_L$ and the gap length $L_G$ of the adjacent gap 64.

As the label stock 18 moves in the transportation direction C the electromagnetic radiation detector 52 of the sensor will produce a sensor signal 56 which is indicative of a property of at least a portion of the label stock 18. In particular, the sensor will produce a sensor signal 56 which is indicative of a periodic property of at least a portion of the label stock 18. In other words the sensor will produce a sensor signal 56 which is periodic given the nature of the label stock 18. In this case the electromagnetic transmittance of the label stock 18 can be said to be a periodic property of the label stock which varies along the length (in a direction generally parallel to the transportation direction C) of the label stock 18. That is to say, the sensor signal 56 will vary periodically as the beam 58 of electromagnetic radiation periodically passes through a gap 64, and then a label 62 affixed to the label web 60 in an alternating manner. The period of the periodic sensor signal 56 produced by the electromagnetic radiation detector 52 will be equal to the time taken for the label stock 18 to be transported in the transportation direction C by a distance equal to the pitch length $L_P$ (i.e., the sum of the label length $L_L$ and the gap length $L_G$.).

Figure 9:
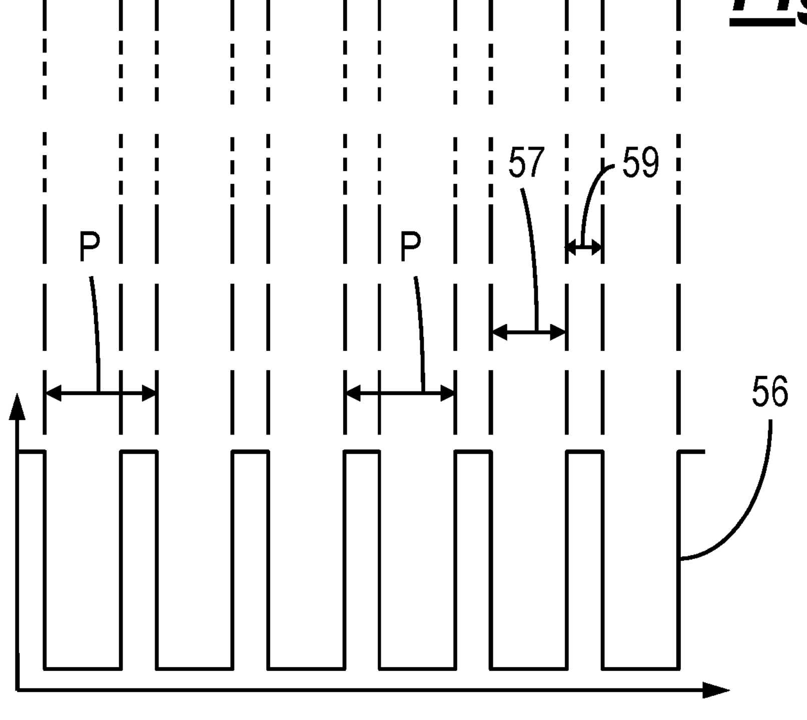
FIG. 9 shows a schematic graph of a sensor signal produced by a sensor which forms part of a labelling machine, the sensor signal being produced when the portion of label stock shown in FIG. 8 is utilised in conjunction with the labelling machine.

In general terms, where a leading label edge passes the electromagnetic radiation detector 52 the sensor signal 56 changes from having a relatively high value to a relatively low value. Similarly, where a trailing label edge passes the electromagnetic radiation detector 52 the sensor signal 56 changes from having a relatively low value to a relatively high value. The change in sensor signal 56 as the portion of label web shown in FIG. 8 passes the electromagnetic radiation detector is shown in FIG. 9 where the period of the signal p is marked. A transition from a gap to a leading edge of a label is represented by a signal transition from a relatively high value to a relatively low value. A transition from a trailing edge of a label to a gap is represented by a signal transition from a relatively low value to a relatively high value.

In known labelling machines, a motive apparatus which is used to advance the label web along the label web path may be controlled based on the sensor signal produced by the gap sensor to effect a desired displacement of the web along the web path so as to position a particular portion of label stock at a desired location. For example, referring to FIG. 7, the edge **66*p* of the labelling peel beak (at which the labels are separated from the web) and the point at which the beam 58 of electromagnetic radiation passes through the label stock are separated by a distance along the web path marked by $D_B$. The controller may be configured such that when an edge of a label 62 passes through the beam 58 of electromagnetic radiation (and the detector of the gap sensor provides a sensor signal to the controlled indicative of such), the controller energises the motive apparatus (for example, take up motor) such that motive apparatus advances the label web by a length which is equal to the distance $D_B$ to thereby position the edge of the label which passed through the beam 58 of electromagnetic radiation at the edge 66*p*** of the labelling peel beak.

The structure and operation of a known label applicator assembly including a known type of gap sensor has been discussed above. This type of gap sensor suffers from several disadvantages. First, when known gap sensors are used as a basis for controlling a motive apparatus of a labelling machine in order to effect a desired displacement of the web along the web path so as to position a particular portion of the label stock of the desired location, the distance along the web path between the gap sensor and the desired location will influence the accuracy with which the particular portion of the label stock can be located at the desired location. In particular, the greater the distance along the label web path between the gap sensor and the desired location, the greater the likelihood that the motive apparatus will be controlled to advance the label web in an inaccurate manner such that the particular portion of the label stock is inaccurately located at the desired location. If the desired location is an edge of a labelling peel plate (such as that indicated by 66 in FIGS. 3, 4 and 6) the gap sensor it is common for the gap sensor to be located upstream (with respect to the direction of travel of the label web along the web path) of the labelling peel plate. It is common for gap sensors in this situation to be located a significant distance along the web path upstream of the labelling peel plate. Consequently, as discussed above, such known labelling machines may suffer inaccuracy when attempting to position a particular portion of label stock at the edge of a labelling peel plate.

Secondly, known gap sensors tend to take the form of one or more components located at a particular location along the web path separate to other components of the labelling machine. For example, the one type of known gap sensor takes the form of a fork-shaped member, the label stock, in use, passing between the tines of the fork. The fact that the gap sensor is formed from one or more components which are separate to the other components of the labelling machine not only increases the financial cost, time and complexity required to produce the labelling machine, but also increases the complexity of the web path between the supply spool and take up spool. Furthermore, the gap sensor is an additional component which may be susceptible to being attached to by a loose label of the label stock. If a label of the label stock attaches itself to the gap sensor then this may cause the gap sensor (and hence labelling machine) to stop functioning correctly and/or cause the label stock to jam.

Some known gap sensors are movable along the web path so as to adjust the point at which a label passing through the gap sensor triggers the controller to commence stopping the motive apparatus which is used to advance the label web along the web path. The fact that the gap sensor is movable gives rise to the possibility that it is incorrectly positioned or detached from the labelling machine and subsequently misplaced or damaged.

Finally, with known gap sensors, it is possible for the label stock to pass through the gap sensor in a non-position-controlled manner. For example, with reference to FIG. 7, as the label stock is passing the gap sensor, the label web may move in a direction perpendicular to the direction of travel C of the label web (i.e. into or out of the plane of FIG. 7 itself). Alternatively, or in addition, the label stock may move in a direction parallel to that of the beam of radiation 58 either towards the detector 52 or away therefrom. Any of these movements (other than the desired movement of the label stock in the direction C along the web path) which occur as the label stock passes through the gap sensor may result in an inaccuracy in the gap sensor determining the position of a portion of the label stock (for example the edge of a label) with respect to the gap sensor. Consequently, if movement of the label stock along the web path is controlled based on the gap sensor output, the label stock may be advanced along the web path in an inaccurate manner.

The present invention provides a gap sensor assembly which obviates or mitigates at least one of the disadvantages of known gap sensors as set out above or otherwise.

Referring to FIG. 5, the gap sensor assembly includes a sensor arrangement comprising a transmitter portion 50*a* and a receiver portion 52*a*. The transmitter portion 50*a* is powered by a power source via a power line (not shown). The sensor, and in particular the receiver portion 52*a*, is configured to produce a sensor signal in a corresponding manner to that of the known gap sensor discussed above.

The transmitter portion 50*a* includes a plurality (in this case eight) discrete electromagnetic radiation sources 50*b*. In the present case the radiation sources 50*b* are LEDs which emit electromagnetic radiation in the infrared (about 770 nm to about 1 mm wavelength) part of the electromagnetic spectrum.

In a similar manner to the transmitter portion 50*a*, the receiver portion 52*a* comprises a plurality of discrete electromagnetic radiation detectors 52*b* in the form of photodiodes which are sensitive to infrared radiation. In use the label stock (not shown in FIG. 5) contacts the roller at the surface 53 before passing to the labelling peel plate. As such, in use, the label stock passes between the electromagnetic transmitter portion 50*a* and the receiver portion 52*a*.

Each of the radiation sources 50*b* forms a sensor pair with a corresponding radiation detector 52*b*. One such sensor pair is indicated as 53*a*. In the present embodiment the transmitter portion 50*a* includes all the radiation sources 50*b* and the receiver portion 52*a* includes all of the radiation detectors 52*b*. As such, the radiation source 50*b* of any sensor pair is part of the transmitter portion 50*a* and the radiation detector 52*b* of any sensor pair is part of receiver portion 52*a*. In other embodiments, like the present embodiment, the transmitter portion 50*a* may include at least one radiation source 50*b*, each of the at least one radiation source 50*b* forming a sensor pair with a corresponding radiation detector 52*b* of the receiver portion 52*a*. However, in addition, in such embodiments, the transmitter portion 50*a* may also include at least one radiation detector 52*b*, each of the at least one radiation detector 52*b* forming a sensor pair with a corresponding radiation source 50*b* which forms part of the receiver portion 52*a*.

The electromagnetic radiation sources 50*b* are arranged in a substantially linear formation and are spaced from one another in a direction which is substantially perpendicular to the label web path as it passes through the gap sensor (i.e. whilst the label stock contacts the roller). Referring to FIG. 5, the electromagnetic radiation sources 50*b* are spaced from one another in the direction indicated by X. The label web path as it passes through the gap sensor within FIG. 5 is perpendicular to the plane of the figure, out of the page towards the observer. The radiation sources 50*b* are also spaced from one another in a direction (i.e. direction indicated by X in FIG. 5) which is substantially perpendicular to the direction of the receiver portion 52*a* from the transmitter portion 50*a*. Within FIG. 5 the direction of the receiver portion 52*a* from the transmitter portion 50*a* is indicated by Y.

Likewise, the electromagnetic radiation detectors 52*b* are spaced from one another in a direction which is substantially perpendicular to the direction of the web path through the gap sensor. Referring to FIG. 5, the electromagnetic radiation detectors 52*b* are spaced from one another in the direction indicated by X. The label web path as it passes through the gap sensor within FIG. 5 is perpendicular to the plane of the figure, out of the page towards the observer. Furthermore, the radiation detectors 52*b* are spaced from one another in a direction (i.e. direction indicated by X in FIG. 5) which is substantially perpendicular to the direction of the receiver portion 52*a* from transmitter portion 50*a*. Within FIG. 5 the direction of the receiver portion 52*a* from the transmitter portion 50*a* is indicated by Y.

The roller 30*d* is formed as a generally hollow cylinder. The transmitter portion 50*a* is located within the roller 30*d*. In particular, the transmitter portion 50*a* extends along the longitudinal axis F of the roller 30*d*. In the present embodiment the transmitter portion 50*a* is fixed with respect to the support 30*c*, and the roller 30*d* rotates about the transmitter portion 50*a*.

The roller is formed (at least in part) from a material which is transparent to the radiation produced by the transmitter portion. As such, in use, the radiation sources 50*b* of the transmitter portion 50*a* produce beams of detection radiation which pass through the roller 30*d* and are incident (if unobstructed) on the corresponding detectors 52*b* of the receiver portion 52*a* (i.e. on the detector which is in the same sensor pair as the particular source).

The receiver portion 52*a* is located within the housing 30*f*. A gap is formed between the roller 30*d* and the housing 30*f* through which the label stock passes during use.

The method of operation of the transmitter portion 50*a* and receiver portion 52*a* of the presently described gap sensor arrangement in accordance with an embodiment of the present invention is substantially the same as that previously discussed in relation to known gap sensors. Consequently, further detail as to the manner in which the gap sensor according to an embodiment of the present invention operates is omitted.

The gap sensor arrangement according to an embodiment of the present invention has several advantages over known gap sensors. First, the roller 30*d* is located as close as possible to the labelling peel plate 30*e*. Because of this, and because a portion of the gap sensor arrangement is located at (or more particularly, inside) the roller 30*d*, this means that the gap sensor is located as close as possible to the labelling peel plate 30*e*. In the situation where it is desired to locate a portion of the label stock (for example the edge of a label) at a desired location along the web path (for example at the edge 66 of the labelling peel plate 30*e*) based on the output of the gap sensor, locating the gap sensor as close as possible to the labelling peel plate will ensure the greatest possible accuracy for positioning the portion of the label stock at the desired location along the web path. This may have the subsequent benefit that it is possible to more accurately locate a label dispensed by the labelling machine on to a desired article.

Secondly, because the gap sensor is located inside the roller 30*d* and inside the housing 30*f*, no parts of the gap sensor are exposed. Consequently, it is not possible for an operator of the labelling machine to inadvertently move or damage the gap sensor.

Thirdly, because the gap sensor is located in the roller 30*d* and housing 30*f*, there are no separate components (i.e. other than the roller and housing—which are part of the labelling machine in absence of the gap sensor) required for the gap sensor. As such, the labelling machine may be more straightforward and/or cheaper to manufacture. Furthermore, because the label web does not have to pass through a separate gap sensor, the label web path through the labelling machine is more straightforward. This may make webbing-up the labelling machine more straightforward and less time consuming. Furthermore, because the label web does not have to pass through a separate gap sensor, it is much less likely that the gap sensor will become blocked by labels detaching from the label web, thus improving the reliability of the labelling machine.

Finally, as the label stock is advanced along the web path (particularly in the case where the motive apparatus advancing the label stock along the web path is located at or downstream of the roller 30*d*), the label stock is held in tension around the roller 30*d*. This means that the label stock is unlikely to track (i.e. move in a direction perpendicular to the direction of movement of the label stock along the web path, in a direction substantially parallel to the longitudinal axis F of the roller 30*d*) or move away from the roller 30*d* in a direction substantially perpendicular to both the direction of movement of the label stock along the web path and substantially perpendicular to the longitudinal axis F of the roller. As such, the position of the label stock as it passes the gap sensor is more controlled in the case of the gap sensor arrangement according to the present invention as compared to known gap sensors. This enables the gap sensor to more accurately detect the position of the label stock along the web path and hence, in a situation where it is desirable to move the label stock along the web path to a desired position, it will enable such positioning of the label stock along the label web path to be carried out with greater accuracy.

In some embodiments the roller 30*d* may be formed from a material (or coated in a material) which is resistant to the adhesive used on the labels of the label stock. As such, if a label from the label stock were to become detached from the label web and somehow contact the roller, this would reduce the likelihood that the label would stick to the roller. If a label becomes stuck to the roller, it will cause part of the roller to no longer be transparent to the detection radiation and thereby adversely affect the operation of the gap sensor. Consequently, forming the roller from a material (or coating the roller in a material) which reduces the likelihood that a label may stick to the roller will reduce the likelihood that the gap sensor will stop functioning correctly due to a label becoming attached to the roller.

A further benefit of the present invention is that if a label (or other foreign object) does get stuck between the transmitter portion and the receiver portion of the gap sensor, then it is easy to remove the stuck label (or other foreign object) by rotating the roller, locating the label (or other foreign object) wherever it may be on the roller and removing it. The entire surface of the roller can easily be inspected by rotating the roller. By comparison, if a label (or other foreign object) gets stuck in a known 'fork-type' gap sensor, then it can be very difficult to locate the label (or other foreign object) between the tines of the fork. Even once the label (or other foreign object) has been located, then it can still be difficult to remove because access to the space between the tines of the fork-type sensor is restricted. In order to access the space between the tines of the fork-type sensor a user may try to use a thin object such as a screwdriver to remove the label (or other foreign object). This may result in damage to the sensor. A gap sensor according to the present invention has no such problems.

It will be appreciated that many modifications to the above described embodiment of gap sensor arrangement fall within the scope of the present invention. Some of these are discussed below.

First, the transmitter portion comprises a radiation source which emits infrared radiation and the receiver portion comprises a radiation detector which senses infrared radiation. In other embodiments any appropriate radiation source and detector may be used which are respectively capable of producing electromagnetic radiation of a particular wavelength and detecting said radiation. It will be appreciated however that the material from which the roller 30*d* is formed must be chosen in each case such that it is substantially transparent to the wavelength of radiation concerned. That is to say, the material from which the roller is formed should be such that at least a portion of the radiation produced by the transmitter portion passes through the roller such that it may be incident on the receiver portion.

Secondly, within the described embodiment the transmitter portion is located within the roller and the receiver portion is separate from the roller and, in particular, is located within the housing 30*f*. In other embodiments this situation may be reversed. For example, the receiver portion may be located within the roller and the transmitter portion may be located separate to the roller.

Thirdly, the described embodiment includes eight sensor pairs of radiation sources and radiation detectors. That is to say, the transmitter portion includes eight radiation sources and the detector portion includes eight corresponding radiation detectors. It will be appreciated that in other embodiments the transmitter portion may include any appropriate number (one or more) radiation sources and the receiver portion may include the appropriate number of corresponding radiation detectors. Furthermore, although the described embodiment includes sensor pairs such that a radiation source has a corresponding radiation detector, in other embodiments a single radiation source may have more than one corresponding radiation detector and/or a single radiation detector may have more than one corresponding radiation source. In other words, the transmitter portion may include any appropriate number (one or more) radiation sources and the receiver portion may include any appropriate number (one or more) radiation detectors.

Furthermore, within the described embodiment the radiation produced by the transmitter portion is spaced along the longitudinal axis of the roller. This is achieved by having a number of discrete radiation sources which are spaced along the longitudinal axis of the roller. In other embodiments the transmitter portion may include a radiation source which is capable of producing radiation at a number of positions spaced along the longitudinal axis of the roller. In addition or alternatively, the receiver portion may include a detector which is capable of detecting radiation at a plurality of locations spaced from one another along the longitudinal axis of the roller.

Ways in which a gap sensor assembly according to the present invention may be used within a labelling machine according to the present invention are now discussed.

With reference to FIG. 8, in one embodiment of labelling machine including a gap sensor arrangement according to the present invention the lengths $L_P$, $L_L$ and $L_G$ are measured as follows. The motive apparatus which advances the label stock along the web path can be controlled by the controller such the controller can calculate the linear displacement of the label stock in any given time. Referring to FIG. 9, it can be seen that the sensor signal 56 produced by a gap sensor arrangement according to the present invention varies with position of the label stock depending on whether there is a label or a gap adjacent to the sensor. Consequently, in order to determine the length $L_L$ the controller can calculate the linear displacement of the label stock during the portion of the periodic signal 57 measured by the sensor which is indicative of the presence of a label adjacent the gap sensor arrangement. Likewise, in order to determine the length $L_G$ the controller can calculate the linear displacement of the label stock during the portion of the periodic signal 59 (which in this case has a relatively high value) measured by the sensor which is indicative of the presence of a gap. In order to determine $L_P$ the controller can either add the linear displacements measured for $L_L$ and $L_G$, or the controller can calculate the linear displacement of the label stock during a portion of the periodic signal p.

The controller can calculate the linear displacement of the label web in various ways.

One example is that the labelling machine may include a roller having a known diameter and an encoder may provide a signal to a controller which may be used to measure the rotation of the roller. The roller contacts the label web such that linear movement of the label web against the roller causes the roller to rotate. By multiplying the rotation of the roller in radians (measured by the encoder) by the radius (half the diameter) of the roller, the linear displacement of the label web can be determined by the controller. Within the embodiment shown in FIGS. 3 to 6, roller 30*g* is a roller with an associated encoder of the type discussed above.

In another example the controller may be provided with information as to the diameter of the spool supported by the take up spool support. The controller can then control a stepper motor which drives the take up spool support so that it monitors the number of steps the stepper motor is commanded to take in a given time. By multiplying the number of steps the stepper motor is commanded to take in a given time by the known angular movement of the stepper motor per step, the controller can calculate the angular movement of the stepper motor and hence the take up spool support in said given time. By multiplying the radius (half the diameter) of the spool supported by the take up spool support and the angular movement of the take up spool support in said given time, the controller can calculate the linear displacement of the label stock due to label stock being wound on to the take up spool support during said given time. Such displacement information can be used to determine $L_L$, $L_G$ and/or $L_P$ as discussed above.

The controller of the labelling machine may configured to calculate a displacement of the web along the web path based upon the sensor signal 56 and a length of a component of the label stock 18. In one example, the sensor signal is provided by the electromagnetic detector and the length of a component of the label stock is the pitch length $L_P$ (i.e., the sum of the label length $L_L$ and the gap length $L_G$). In use the controller monitors the sensor signal 56 and counts the number of periods of the periodic sensor signal which are provided to it. As previously discussed, this corresponds to the number of times the beam of electromagnetic radiation passes through a label 62 and an adjacent gap 64. Consequently, the controller calculates the displacement of the web along the web path by multiplying the number of periods of the sensor signal provided to it by the pitch length $L_P$ of the label stock 18.

In some embodiments, the controller may also be configured to monitor the period of the periodic sensor signal 56. The controller may then calculate a speed of the web along the web path by dividing the pitch length $L_P$ (i.e., the sum of the label length $L_L$ and the gap length $L_G$) by the period of the sensor signal 56.

In some embodiments the controller may use a monitored period of the periodic sensor signal 56 in combination with a count of the number of periods of the sensor signal (which need not be an integer number) which have been supplied to the controller in order to determine the displacement of the web at times other than when an edge of a label 62 passes through the beam of electromagnetic radiation. For example, if it is known that the time period since a label leading edge passed through the beam of electromagnetic radiation is half the monitored period, it can be deduced that the displacement is equal to half the pitch length $L_P$.

The displacement of the web along the web path calculated by the controller based on the sensor signal may be used in several different contexts. For example, the displacement calculated by the controller may be used to provide information as to the total amount of label stock which has passed the sensor.

In another example, a desired displacement of the web may be effected to control the position of a given portion of label stock relative to a known position. For example, referring to FIG. 7 (although the principle is the same for embodiments of the present invention), the edge 66 of the labelling peel beak (at which the labels are separated from the web) and the point at which the beam 58 of electromagnetic radiation passes through the label stock are separated by a distance along the web path marked by $D_B$ The controller may be configured such that when an edge of a label 62 passes through the beam 58 of electromagnetic radiation, the controller then energises the take up motor such that the take up motor takes up a length of web which is equal to the distance $D_B$ to thereby position the edge which passed through the beam 58 of electromagnetic radiation at the edge 66 of the labelling peel beak.

It will be appreciated that the displacement of the web along the web path calculated by the controller based on the sensor signal produced by the gap sensor, and the pitch length $L_P$ (i.e., the sum of the label length $L_L$ and the gap length $L_G$) may be used to both determine (i.e., in this particular context, measure) and control the displacement of a portion of the label stock along the web path from any desired position and/or by any desired length.

In other embodiments, the gap sensor may be configured to produce a sensor signal which is a function of a property of a portion of the label stock other than its electromagnetic transmittance. Examples of such properties include, but are not limited to, the electromagnetic reflectivity, thickness, acoustic transmittance, electrical conductivity, dielectric constant and capacitance of a portion of the label stock.

In the described embodiment, the portion of the label stock of which a periodic property is measured by the sensor comprises the web and the attached labels. In other embodiments, this need not be the case. For example, some embodiments may only measure a periodic property of the labels attached to the web. This may occur when the label stock includes labels which are attached to a web and which are adjacent to one another such that there is no gap between adjacent labels. In this case, the sensor may detect a periodic property of the labels attached to the web which varies periodically due to the fact that said property is different at the border between two adjacent labels compared to at another location on said label.

In another embodiment, the sensor may only measure a periodic property of the web. For example, a sensor may be configured to measure a property of the web after the labels have been detached from the web. For example, some label stock may have a web which, even once the labels have been removed, possesses some periodic feature. For example, if the labels are die-cut when the label stock is produced, then the web may include indentations resulting from said die-cutting which are present on the web even once labels have been removed. These indentations may have a property which is different to portions of the web which have not been indented. For example, the thickness of the web at the location of an indentation may be less than the thickness of the web at a position which has not been indented. Consequently, a sensor which is capable of measuring this difference in thickness of the web between indented portions and non-indented portions would be capable of producing a sensor signal indicative of a periodic property of a portion of the label stock such that the controller can calculate the displacement of the web and perform the functions set out above.

Known labelling machines which incorporate a gap sensor of the type shown in FIG. 7 may incorrectly sense the edge of certain labels. This is explained further in conjunction with FIGS. 10 to 12.

Figure 10:
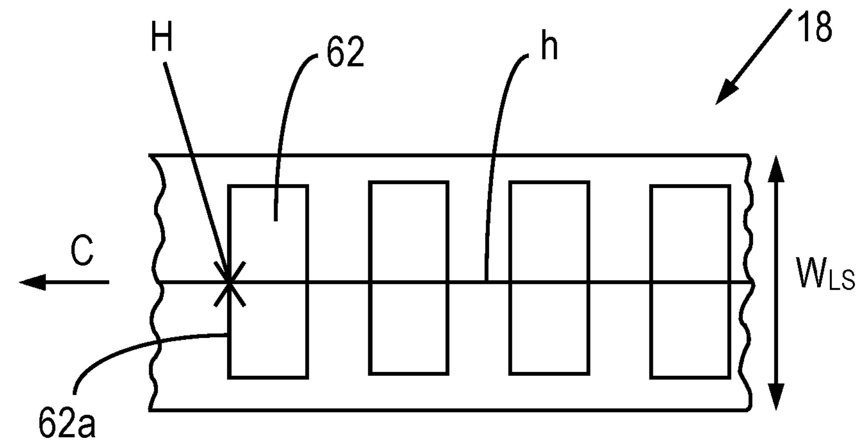
FIGS. 10, 11 and 12 show schematic plan views of three separate label stocks which are utilised in conjunction with a known labelling machine.

FIG. 10 shows a portion of label stock 18 which may pass between the electromagnetic radiation detector 52 and the electromagnetic radiation transmitter 50 of the gap sensor. The label stock has a width $W_{LS}$. The position on the label stock 18 at which the beam of electromagnetic radiation 58 passes through the label stock 18 (as the label stock 18 moves past the beam of electromagnetic radiation 58) is indicated by a line h. It can be seen that the line h is located approximately halfway across the width $W_{LS}$ of the label stock 18. As the label stock 18 travels along the web path in the direction C the gap sensor will detect the leading edge of label 62 when the label stock 18 is aligned with the gap sensor such that the beam 58 of electromagnetic radiation produced by the electromagnetic transmitter 50 of the gap sensor passes through point H. The gap sensor then provides a signal to a controller to indicate the position on the label stock at which a leading edge of a label has been detected.

The controller then advances the label stock 18 in the direction C a fixed 'feed' distance to dispense a label. If the label pitch of the label stock is larger than the distance $D_B$ (shown in FIG. 7) then the feed distance will be approximately $D_B$. This distance $D_B$ is the distance between the edge 66 of the labelling peel beak and the point at which the beam 58 of radiation passes from the transmitter 50 to the detector 52 as was described above. If the label pitch of the label stock is less than the distance $D_B$, then feed distance will be smaller than $D_B$ to ensure that only one label is dispensed. In either case the exact distance fed to dispense one label is usually provided with manual adjustment since different applications may require the label to stop at different places relative to the labelling peel beak.

Another reason why manual adjustment of the feed distance is generally provided is that known gap sensors typically have a single emitter and single detector and so only sense a single position along a label edge as shown by the line h in FIG. 18. This means that the position of the sensor will typically be manually moved, across the width of the label i.e. in a direction perpendicular to direction C, to accommodate different shapes and sizes of label. If the labels in use do not have leading edges which are straight and perpendicular to the direction of movement C, then the position of the gap sensor along a line perpendicular to the direction of movement C will affect the stopping position of the label. Such manual adjustment of the gap sensor can be a further source of variation in label positioning relative to the labelling peel beak.

Figure 11:
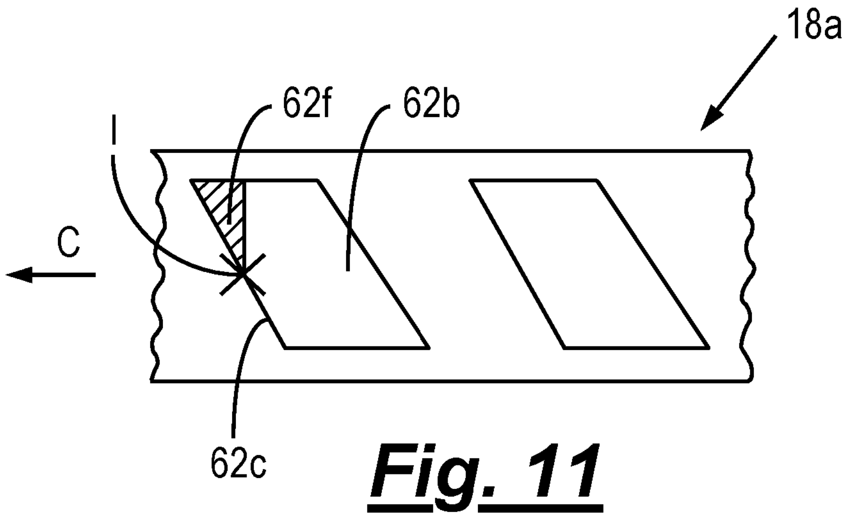
Figure 12:
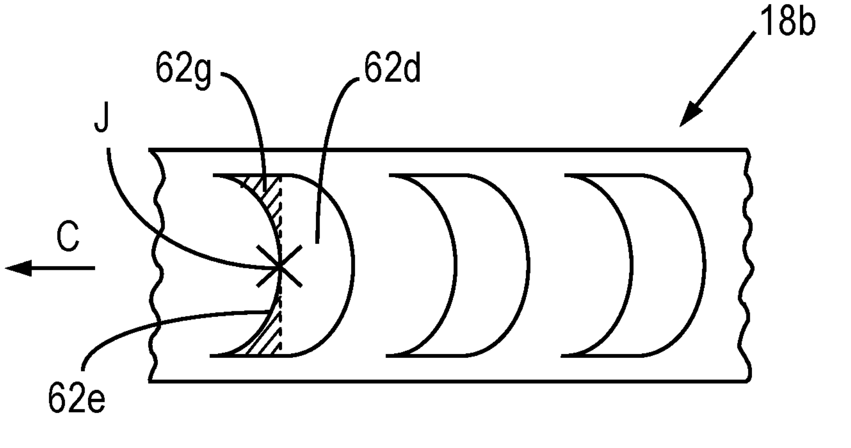

FIGS. 11 and 12 show portions of two different label stocks 18*a*, 18*b* which have differently shaped labels, 62*b* and 62*d* respectively, compared to those shown in FIG. 10. More particularly, FIG. 11 shows parallelogram shaped labels having two edges arranged parallel to the direction of travel of the label 18*a*, while FIG. 12 shows crescent shaped labels. It can be seen that as the label stocks 18*a*, 18*b* are advanced in the direction C the gap sensor of the labelling machine will sense the leading edge of the labels 62*b* and 62*d* when the beam 58 of radiation passes through points I and J respectively. Thus it can be seen that variation in the position of the gap sensor, in the direction perpendicular to direction C, will cause variation in the position along the direction C at which a label edge is detected and hence in the label stopping position.

Figure 13:
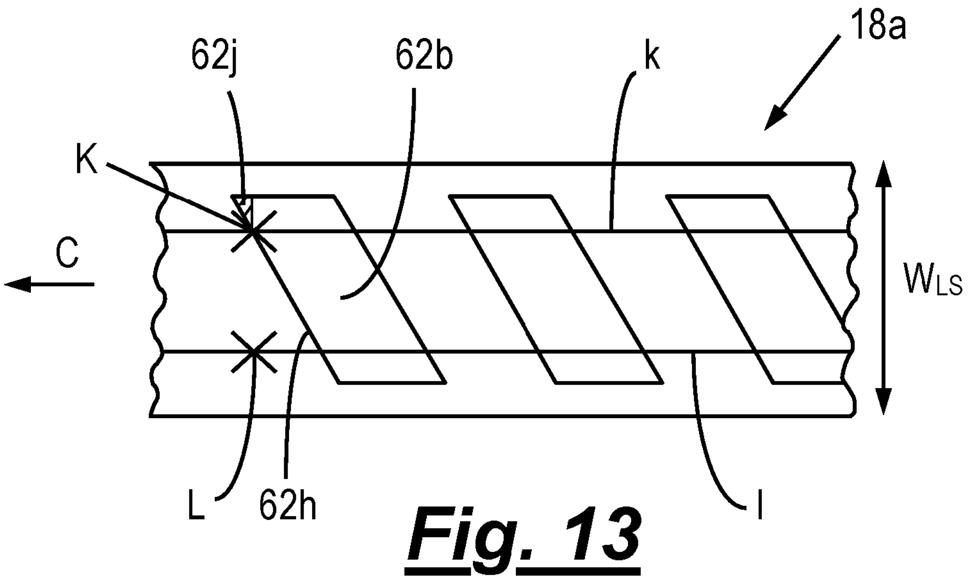
FIGS. 13 and 14 show schematic plan views of a label stock which is utilised in conjunction with labelling machines in accordance with two separate embodiments of the invention.

An embodiment of the present invention obviates or mitigates the above described problem by removing the need for manual adjustment of the sensor position in the direction perpendicular to the direction C. FIG. 13 shows a portion of the label stock 18*a* shown in FIG. 11 passing through a portion of a labelling machine having a gap sensor according to an embodiment of the present invention.

In this embodiment the gap sensor includes a transmitter portion and receiver portion which are similar to those shown in FIG. 5. The transmitter portion and receiver portion are configured to receive a portion of the label stock 18*a* between them.

However, the gap sensor of this embodiment is configured to produce a sensor signal which is a function of a property of a portion of the label stock 18*a* at two positions which a spaced apart in a direction non-parallel (in this case, perpendicular) to the direction of travel of the label web along the web path (as compared to being a function of a property of a portion of the label stock 18*a* eight positions spaced apart in the same way within the embodiment shown in FIG. 5). That is to say, at any given time, the gap sensor produces a sensor signal which is a function of a property of the label stock at a plurality of positions at said given time.

In the case shown in FIG. 13 the transmitter portion includes two electromagnetic radiation sources. The electromagnetic radiation sources each produce a beam of electromagnetic radiation which passes through the label stock 18*a*. The positions on the label stock 18*a* at which the beams of electromagnetic radiation produced by the electromagnetic radiation sources pass through the label stock 18 (as the label stock 18 moves past the gap sensor) are indicated by lines k and l respectively. It can be seen that in this embodiment the electromagnetic radiation sources of the transmitter portion are located such that the lines k and l are spaced approximately one-fifth of the label stock width $W_{LS}$ from a respective edge of the label stock 18*a*. It will be appreciated that in other embodiments, the lines k and l may be positioned at any appropriate spacing from a respective edge of the label stock 18*a*. Furthermore, in some embodiments, the lines k and l may be spaced different distances from their respective edges.

The receiver portion of the sensor includes at least one electromagnetic radiation detector. The one or more electromagnetic radiation detectors are configured such that the beams of electromagnetic radiation which are emitted by the transmitter portion and passed through the label stock 18*a* are incident on the one or more electromagnetic radiation detectors. In some embodiments there may be only one electromagnetic radiation detector upon which both of the beams of electromagnetic radiation are incident. In other embodiments, each of the beams of electromagnetic radiation may be incident upon its own electromagnetic radiation detector.

The receiver portion outputs a signal based on the amount of electromagnetic radiation emitted by the transmitter portion which is transmitted through the label stock 18*a* and is incident on the receiver portion.

As can be seen from FIG. 13, as the label stock 18*a* passes along the web path in the transportation direction C the label 62*b* will at least partially obscure the beam of radiation passing through point K when the label stock 18*a* (and hence label 62*b*) is positioned relative to the transmitter and receiver portions as shown in FIG. 20. Due to the label 62*b* at least partially obscuring the beam of electromagnetic radiation passing through point K the sensor signal produced by the receiver portion of the sensor will differ from the sensor signal before the label 62*b* reaches point K (i.e., when the beam of radiation at point K is only passing through the web and not a label) such that the controller determines that, when the label stock 18*a* is at a position relative to the transmitter and receiver portion as shown in FIG. 20, a leading edge 62*h* of a label 62*b* has been detected.

The controller may be configured such that, based upon a change in the sensor signal (for example, the change in the sensor signal between when the label stock is positioned such that the beams of electromagnetic radiation pass through only the web, and when at least one of the beams of electromagnetic radiation is at least partially occluded by the leading edge 62*h* of a label 62*b*) the controller may control the motive apparatus which advances the label stock 18*a* along the web path in the direction C so as to position a portion of the label stock at a desired location along the web path.

Some of the previously described embodiments operate such that, in attempting to position a desired portion of each label (for example the forward-most point, with respect to the direction of travel C, of the leading edge of each label) at a desired position along the web path (for example at the edge 66 of the labelling peel plate), the gap sensor attempts to detect the desired portion of each label and then, once the desired portion of each label has been detected, the controller advances the label stock a known distance along the web path between the gap sensor and the desired position along the web path. In other embodiments this need not be the case.

For example, some embodiments may operate as follows. The gap sensor is positioned so as to detect a first portion of each label. Once the first portion of the label has been detected, the controller advances the label stock a predetermined distance along the web path such that the desired portion of the label (which is different to the first portion of the label) is positioned at the desired position along the web path. For example, if the gap sensor is configured to detect a first portion of each label which is located 2 cm behind (in a direction parallel to the direction of travel C) the forward-most point (with respect to the direction of travel C) of the leading edge of the label. If it is desired to locate the forward-most point of the label at the edge of the labelling peel beak then this may be achieved as follows. Once the gap sensor has detected the first portion of a label, the controller controls the take up motor to advance the label stock along the web path by the distance along the web path between the edge of the labelling peel beak and the gap sensor, minus a distance of 2 cm (i.e. the displacement in the direction of travel C between the portion of the label detected by the gap sensor and the desired portion of the label).

In some embodiments the distance along the web path between the desired position along the web path and the gap sensor, and the displacement in the direction of travel C between the portion of the label detected by the gap sensor and the desired portion of the label may be measured using any appropriate distance measuring apparatus. In other embodiments the distance along the web path between the desired position along the web path and the gap sensor, and the displacement in the direction of travel C between the portion of the label detected by the gap sensor and the desired portion of the label may be manually set by the user of the labelling machine. For example, the user may manually adjust the distance (also known as the feed distance) which the controller controls the take up motor to advance the label stock along the web path after the first portion of a label has been sensed, so that the desired portion of each label is located at the desired position along the web path after the label stock is advanced by the feed distance subsequent to the first portion of each label being detected by the gap sensor.

The feed distance is generally kept constant for a given combination of gap sensor configuration and type of label stock. In order for these types of labelling machine to operate correctly, it may be important for the gap sensor to correctly detect the position of the first portion of each label. The position at which the first portion of each label is detected by the gap sensor may be referred to as the trigger position. It is desirable that the trigger position corresponds to the same portion of each label as the label stock passes the gap sensor, even if the label stock tracks (i.e. moves in a direction perpendicular to the direction of travel C).

Figure 15:
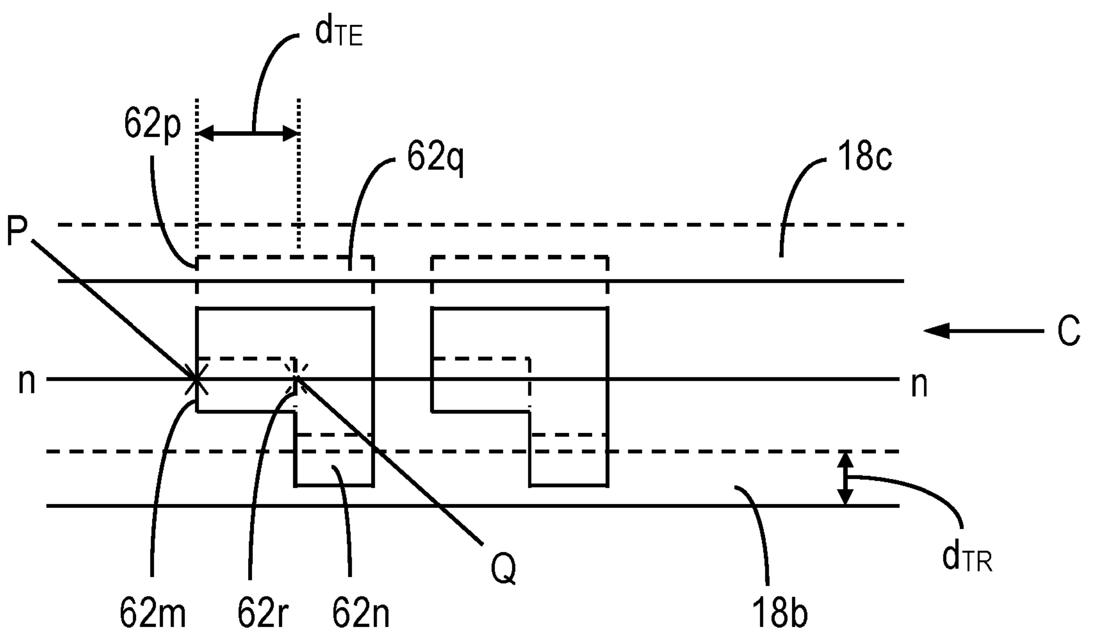
FIG. 15 shows a schematic plan view of a label stock which is utilised in conjunction with a known labelling machine.

FIG. 15 shows a portion of label stock 18*b* in solid line which passes through a known gap sensor of the type discussed in relation to FIGS. 10 to 12. The label stock 18*b* passes between a detector and a transmitter of the gap sensor in the manner previously discussed. The beam of electromagnetic radiation produced by the transmitter portion of the gap sensor is incident on the label stock 18*b*. As the label stock 18*b* moves past the beam of electromagnetic radiation the beam of electromagnetic radiation traces a path along the label stock indicated by line n. It can be seen that, in this case, line n is located approximately halfway across the label stock 18*b*.

In this example the gap sensor is located across the web path (i.e. at a position perpendicular to the direction of travel C of the label stock) so that the trigger point for each label is a leading edge of each label. As the label stock 18*b* travels along the web path in the direction C, the gap sensor will detect the leading edge 62*m* of the label 62*n* when the label stock 18*b* is aligned with the gap sensor such that the beam of electromagnetic radiation produced by the electromagnetic transmitter of the gap sensor passes through point indicated by P. The gap sensor then provides a signal to the controller to indicate trigger position. In this case the trigger position correctly corresponds to the position of the label stock 18*b* at which the leading edge 62*m* of a label 62*n* has been detected by the gap sensor. The controller may then use this information to advance the label stock a desired distance so as to position a desired portion of the label 62*n* at a desired position along the web path. For example, the controller may control the take up motor to advance the leading edge 62*m* of the label 62*n* so that it is located at the edge of the labelling peel beak.

In some labelling machines, as the label stock moves along the web path between the supply spool support and the take up spool support, the label stock may move in a direction perpendicular to the direction of travel C of the label stock 18*b*. Such movement of the label stock 18*b* in a direction perpendicular to the direction of travel C may in some cases be undesirable and may be referred to as 'tracking' of the label web. Such tracking generally occurs as the label web moves substantially within the plane occupied by the label web.

FIG. 15 also shows in dashed-line a portion of label stock 18*c* which is equivalent to the label stock 18*b* but has undergone tracking (i.e., movement perpendicular to the direction of travel of the label stock C) relative to the label stock 18*b* by moving upwards (with respect to the orientation of the Figure) by a distance $d_{TR}$. Due to the fact that the label stock 18*c* (and hence the attached labels 62*q*) has moved upwards the leading edge 62*p* of the label 62*q* will no longer be detected by the gap sensor as the label stock moves along the web path in direction C. Instead, a second edge 62*r* of the label 62*q* will be detected. That is to say, the gap sensor will detect the second edge 62*r* of the label 62*q* when the label stock 18*c* is aligned with the gap sensor such that the beam of electromagnetic radiation produced by the electromagnetic transmitter of the gap sensor passes through point indicated by Q. The gap sensor then provides a signal to the controller to indicate trigger position. Due to the fact that the label web 18*c* has undergone tracking relative to the label web 18*b*, the trigger position no longer correctly corresponds to the position of the label stock 18*c* at which the leading edge 62*p* of a label 62*q* has been detected by the gap sensor. Instead, the trigger position incorrectly corresponds to the position of the label stock 18*c* at which the second edge 62*r* of a label 62*q* has been detected by the gap sensor. Consequently, tracking of the label stock has resulted in the trigger position becoming incorrect.

Incorrect determination of the trigger position by the gap sensor may be problematic as follows. The labelling machine may be configured such that the feed distance (i.e. the distance the controller advances the label stock after the gap sensor has detected the trigger position) is appropriate for when the trigger position is when a particular portion of the label is detected by the gap sensor. If, instead, the trigger position becomes when another portion of the label is detected by the gap sensor then the feed distance will no longer be the correct distance to advance the label stock after the gap sensor has detected the trigger position in order that the desired portion of the label is located at the desired position along the web path. This is illustrated below.

It can be seen that positions P and the position Q are both on the line n. However, the points P and Q are spaced by a distance $d_{TE}$. Thus, it will be clear that tracking of the label stock by a distance $d_{TR}$ has caused trigger position measured by the gap sensor to be displaced by a distance $d_{TE}$. In particular, the trigger position is now incorrectly detected a distance $d_{TE}$ behind where it is correctly located. The feed distance has been set such that it is a distance FD based on the trigger point being point P. If the trigger point is incorrectly measured by the gap sensor to be point Q and the label stock is advanced by distance FD when the gap sensor triggers at point Q then the label stock will be advanced to a position where the desired portion of the label stock is a distance $d_{TE}$ further along the web path in the direction C than it should be. This may lead to incorrect dispensing of the labels such that they do not affix to a desired product adjacent the labelling machine in a desired position, or may lead to jamming of the labelling machine.

An embodiment of the present invention seeks to obviate or mitigate the above discussed problem.

Figure 16:
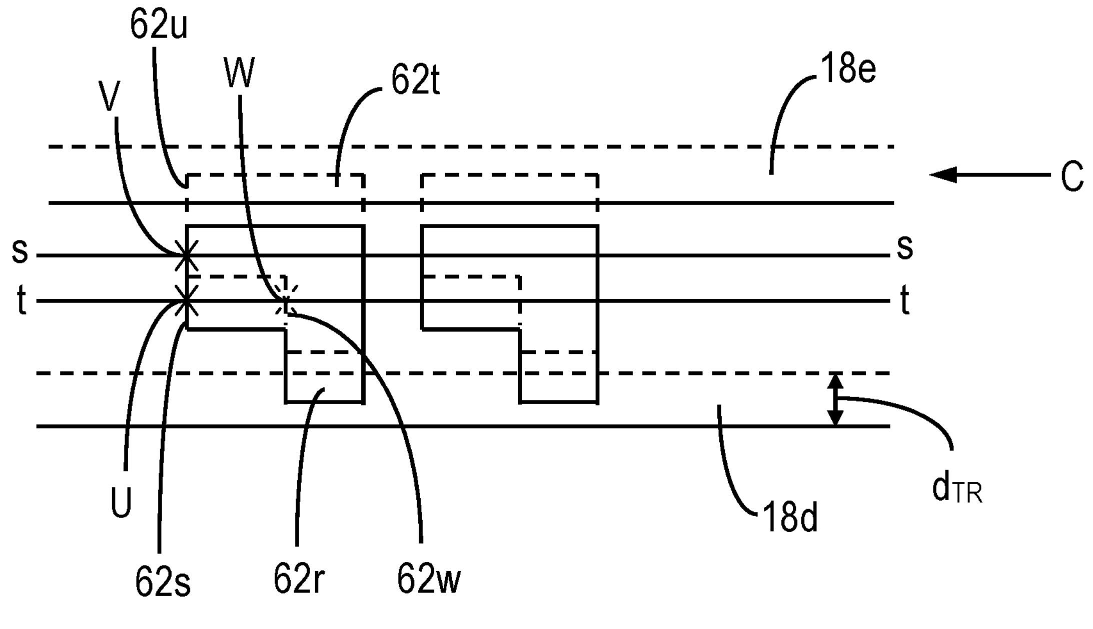
FIG. 16 shows a schematic plan view of the label stock shown in FIG. 15 utilised in conjunction with a labelling machine in accordance with an embodiment of the invention.

FIG. 16 shows a portion of label stock 18*d* and an attached label 62*r* passing a gap sensor according to an embodiment of the present invention. In this case, as in the embodiment shown in FIG. 13, the gap sensor comprises a transmitter portion and receiver portion which are capable of producing a sensor signal which is a function of a property of a portion of the label stock at two positions which are spaced from one another in a direction non-parallel to the web path. In particular, the gap sensor comprises a transmitter portion which includes two electromagnetic radiation sources, although, in other embodiments any appropriate number of radiation sources may be used. The electromagnetic radiation sources each produce a beam of electromagnetic radiation which passes through the label stock 18*d*. The positions on the label stock 18*d* at which the beams of electromagnetic radiation produced by the electromagnetic radiation sources pass through the label stock (as the label stock moves past the gap sensor) are indicated by lines s and t respectively. It can be seen that line t corresponds to line n in FIG. 15.

The receiver portion of the sensor includes at least one electromagnetic radiation detector. The one or more electromagnetic radiation detectors are configured such that the beams of electromagnetic radiation which are emitted by the transmitter portion and passed through the label stock 18*d* are incident on the one or more electromagnetic radiation detectors. In some embodiments there may be only one electromagnetic radiation detector upon which both of the beams of electromagnetic radiation are incident. In other embodiments, each of the beams of electromagnetic radiation may be incident upon its own electromagnetic radiation detector.

The receiver portion outputs a signal based on the amount of electromagnetic radiation emitted by the transmitter portion which is transmitted through the label stock 18*d* and is incident on the receiver portion.

As the label stock 18*d* travels along the web path in the direction C, the electromagnetic radiation of the transmitter of the gap sensor which is incident on line s will be occluded by the leading edge 62*s* of the label 62*r* when the label stock 18*d* is aligned with the gap sensor such that the first beam of electromagnetic radiation produced by the electromagnetic transmitter of the gap sensor passes through the point indicated by V. Likewise, as the label stock 18*d* travels along the web path in the direction C, the electromagnetic radiation of the transmitter of the gap sensor which is incident on line t will be occluded by the leading edge 62*s* of the label 62*r* when the label stock 18*d* is aligned with the gap sensor such that the second beam of electromagnetic radiation produced by the electromagnetic transmitter of the gap sensor passes through the point indicated by U.

The controller is configured to process the signal produced by the receiver of the gap sensor and determines that the reduction in electromagnetic radiation received by the receiver, which occurs due to the label 62*r* occluding the electromagnetic radiation at points V and U when the label stock 18*d* is positioned as shown in FIG. 16, is indicative of the trigger position. In this case it is desired that the trigger position occurs when the leading edge 62*s* of the label 62*r* is at the gap sensor. As such, the controller correctly identifies the trigger position.

FIG. 16 also shows, in dashed-line, a label stock 18*e* having a label 62*t* which is equivalent to the label stock 18*d*, but has moved (or tracked) in a direction perpendicular to the direction of travel C of the label web by a distance $d_{TR}$.

As previously discussed, the distance $d_{TR}$ may be referred to as a tracking distance which has been moved by the label stock 18e.

As the label stock 18e travels along the web path in the direction C, the electromagnetic radiation of the transmitter of the gap sensor which is incident on line s will be occluded by the leading edge 62u of the label 62t when the label stock 18e is aligned with the gap sensor such that the first beam of electromagnetic radiation produced by the electromagnetic transmitter of the gap sensor passes through the point indicated by V. Likewise, as the label stock 18e travels along the web path in the direction C, the electromagnetic radiation of the transmitter of the gap sensor which is incident on line t will be occluded by the second edge 62w of the label 62t when the label stock 18e is aligned with the gap sensor such that the second beam of electromagnetic radiation produced by the electromagnetic transmitter of the gap sensor passes through the point indicated by W.

In the embodiment shown in FIG. 16, even though, as is the case for the known gap sensor shown in FIG. 15, the second beam of radiation produced by the gap sensor (which traces the line t) is not occluded by the leading edge 62u of the label 62t (but rather is occluded by the second edge 62w of the label), the controller still detects the trigger position for label 62t is the same as for label 62r. That is to say.

The trigger position for both label 62r and label 62t is the same and is when the leading edge 62s, 62u of the label 62r, 62t is at a position along the web path such that it is at the gap sensor. Because of this, tracking of the label by a distance $d_{TR}$ has not changed the trigger point and consequently the labelling machine will continue to feed labels to the desired position despite the fact that tracking has occurred.

As discussed, the controller detects the trigger position for label 62t is the same as for label 62r. This is because the controller is configured to monitor the signal produced by the gap sensor and, in order to detect the trigger position, require that the label 62t only occludes the electromagnetic radiation at one of the positions (i.e. whilst the radiation at the other position is not occluded). This may be achieved in various ways.

One example is that the controller may monitor the electromagnetic radiation received at each position individually. Once the controller detects that at one position the electromagnetic radiation has gone from being free to pass through the label web to being occluded by a label, then this may cause the controller to detect a trigger position. In another example, the controller may monitor the total amount of electromagnetic radiation received by the receiver at both positions. The controller may then detect a trigger position when the total amount of electromagnetic radiation received by the receiver falls within a predetermined range (for example below a predetermined threshold).

Although the above described embodiment of the invention comprises a gap sensor which includes transmitter portion with two discrete sources of radiation and receiver with two discrete electromagnetic detectors, other embodiments may include a gap sensor with any appropriate configuration of transmitter and receiver. For example, the receiver may include an elongate, planar photodiode which extends lengthways in a direction that is non-parallel to the direction of travel of the label stock. In some embodiments the planar photodiode may be substantially rectangular. An example of a suitable photodiode is an SLCD-61N4 produced by Silonex, Canada.

In some embodiments, the signal produced by the gap sensor may be monitored by the controller and the maximum and/or minimum value of the signal output by the gap sensor may be monitored to measure of the amount by which the label stock and attached labels have tracked (i.e. moved in a direction perpendicular to the direction of travel of the label web). In other embodiments the controller may monitor the signal from each of a plurality of positions spaced from one another in a direction non-parallel to the web path and based upon the duration that each position is occluded by a label as a label passes and/or based upon whether each position is occluded by a label at all, determine a measure of the amount by which the label stock and attached labels have tracked.

It will be appreciated that, although the transmitter portion and receiver portion of the sensor comprise an electromagnetic radiation source and an electromagnetic radiation detector respectively such that they can collectively produce a sensor signal which is a function of the electromagnetic transmittance of a portion of the label stock at a plurality of positions spaced from one another in a direction non-parallel to the web path, any appropriate sensor which can produce a sensor signal which is a function of any appropriate property of a portion of the label stock at a plurality of positions spaced from one another in a direction non-parallel to the web path may be used. For example, a sensor which is capable of producing a sensor signal which is a function of the electromagnetic reflectance, electrical conductivity or thickness of a portion of the label stock at a plurality of positions spaced from one another in a direction non-parallel to the web path (for example perpendicular to the web path) may be used.

As previously discussed, the sensor which is used in combination with the label stock shown in FIGS. 13 and 16 comprises a transmitter portion and receiver portion which are capable of producing a sensor signal which is a function of a property of a portion of the label stock at two positions which are spaced from one another in a direction non-parallel to the web path. In some embodiments the sensor may comprise a transmitter portion and a receiver portion which are capable of producing a sensor signal which is a function of a property of a portion of the label stock at more than two positions which are spaced from one another in a direction non-parallel to the web path. In some embodiments in which the sensor comprises a transmitter portion and a receiver portion which are capable of producing a sensor signal which is a function of a property of a portion of the label stock at two or more positions which are spaced from one another in a direction non-parallel to the web path, the transmitter portion and a receiver portion may be configured such that there is a discrete receiver portion for each position at which the property of the label stock is measured. This is the case for the embodiment of the invention shown in FIG. 5.

In this case, the sensor may be used to measure the length of a label in the following way. The controller may measure a property of a portion of the label stock using each receiver portion. The controller will count the number of motor steps during which each receiver potion produces a signal which is indicative of the presence of a label (e.g. reduced electromagnetic radiation measured by the receiver). This number of motor steps is the same as the number of motor steps between when each receiver portion produces a signal which is indicative of the absence of a label either side of the label concerned. The controller will then compare the counted number of motor steps for each receiver portion and will determine which receiver portion counted the greatest number of steps. The greatest number of steps will then be used to determine the label length by multiplying the number of steps by the linear label stock displacement per step. The greatest number of steps is used to determine the label length because this corresponds to the number of steps for the receiver portion which detected the presence of a label for the greatest amount of time. The receiver portion which detects the presence of a label for the greatest amount of time will detect a length of the label which is closest to the actual length of the label.

Figure 14:
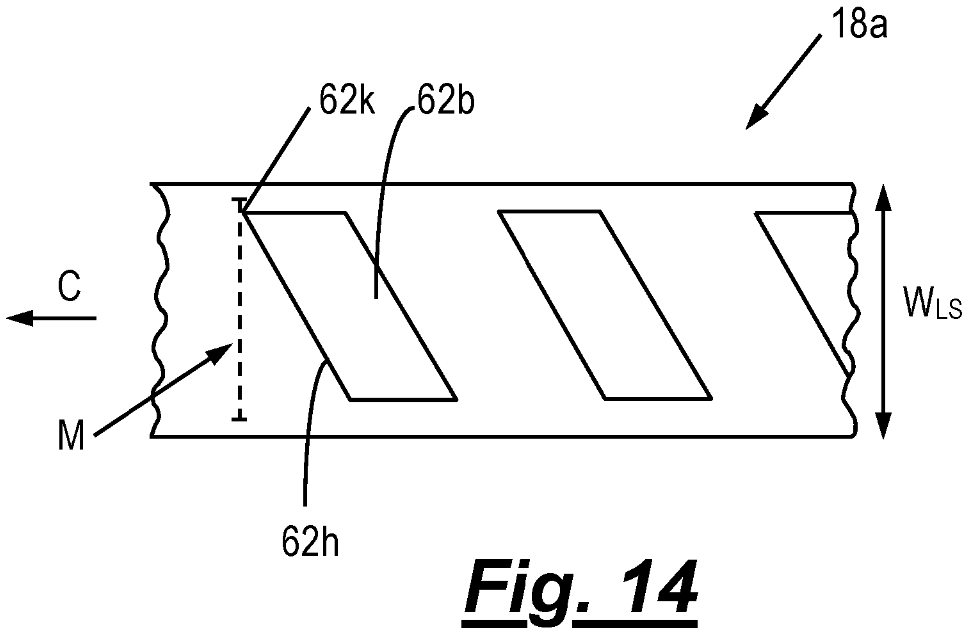

FIG. 14 shows a portion of label stock 18*a* which is the same as that shown in FIGS. 11 and 13 passing through a labelling machine having an alternative gap sensor. In this embodiment the sensor of the labelling machine has a transmitter portion which includes an emitter of electromagnetic radiation which produces a beam of electromagnetic radiation which is strip-like and which is incident on the label stock 18*a* so as to form a line indicated by M. In some embodiments, the emitter of electromagnetic radiation may be configured such that the intensity of the radiation produced by the emitter, which, in use, is incident on the label stock, is substantially uniform along the length of the beam. In some embodiments, such as that previously discussed, the emitter of electromagnetic radiation may be a linear array of LEDs. In the present case, the line M extends across approximately 90% of the width $W_{LS}$ of the label stock 18*a*. It will be appreciated that in other embodiments the line may have any appropriate length. For example, the line may extend beyond the width of the label stock. In other embodiments the line M may extend across less than 90% of $W_{LS}$. For example, in some embodiments the line M may extend across approximately 50% of $W_{LS}$. This may be particularly appropriate if the labels being used are substantially symmetrical about a line which is substantially parallel to the path of the label stock. In this situation the gap sensor may be configured such that the line M extends only across a portion of the label stock which is one side of the line of symmetry of the labels of the label stock.

The electromagnetic radiation produced by the transmitter portion in this embodiment (which is henceforth referred to as the strip of electromagnetic radiation) may be produced by a strip LED device. The strip of electromagnetic radiation is incident on the label stock 18*a* at the position M and passes through the label stock where it is incident on a receiver portion. The receiver portion may comprise a planar photodiode. The transmitter portion of the sensor may be configured such that the strip of electromagnetic radiation has a substantially uniform intensity of electromagnetic radiation produced along its entire length.

It will be appreciated that, in this embodiment, the strip of electromagnetic radiation is incident on the label stock at a plurality of positions which are spaced from one another in a direction non-parallel to the web path C (in fact, the positions are spaced from one another in a direction which is substantially perpendicular to the web path, although this need not be the case in other embodiments). This is because the line M includes a plurality of positions along that line.

A portion of the strip of electromagnetic radiation M which is incident on the label stock 18*a* passes through the label stock 18*a* and is incident on the receiver portion. In this case the receiver portion includes a planar photodiode. An example of a suitable photodiode is an SLCD-61N4 produced by Silonex, Canada. The planar photodiode outputs a sensor signal which is a function of the total amount of electromagnetic radiation which is incident upon it. Consequently, due to the fact that the electromagnetic radiation strip M must pass through the label stock 18*a* in order to reach the planar photodiode of the receiver portion, the sensor signal produced by the planar photodiode of the receiver portion is a function of the transmittance of electromagnetic radiation of the portion of the label stock through which the strip of electromagnetic radiation M passes. Hence the sensor signal is a function of the transmittance of electromagnetic radiation of a plurality of positions across the width of the label stock through which the strip of electromagnetic radiation M passes. The plurality of positions through which the strip of electromagnetic radiation passes are spaced from one another in a direction which is non-parallel to the direction of transport C along the web path.

As can be seen in FIG. 14, when the label stock 18*a* advances along the web path in the direction C and when the label stock 18*a* is located relative to the transmitter portion and receiver portion of the sensor such that the strip of electromagnetic radiation M is located as shown in FIG. 14, as the label stock 18*a* advances further in the direction C, the label 62*b* will begin to occlude at least a portion of the strip M of electromagnetic radiation. Consequently, as the label stock advances in direction C beyond the position shown in FIG. 14, the amount of electromagnetic radiation transmitted through the label stock 18*a* such that it is incident on the planar photodiode of the receiver portion will reduce. The sensor signal is provided to the controller and the controller may identify the presence of an edge (in this case the leading edge 62*h*) of the label 62*b* based on a change in the sensor signal produced by the planar photodiode. For example, if the planar photodiode produces a signal which decreases with decreasing total electromagnetic radiation incident upon it, then the controller may determine the presence of an edge of a label due to a reduction in the magnitude of the sensor signal.

Because the strip M of electromagnetic radiation produced in the described embodiment may be occluded by the very tip of a label, such that this occlusion is detected by the sensor, then the sensor of this embodiment is capable of substantially determining the exact position of the forward-most (with respect to direction C) point of the label 62*b*, such that the controller may correctly position the portion of the label stock at a desired location along the web path. For example, the very tip 62*k* of the label 62*b* may be positioned at the edge 66 of the labelling peel blade 30*e* as shown in FIG. 6.

For the avoidance of doubt, in some labelling machines which include any of the gap sensor arrangements according to the present invention described above, the controller may, based on the sensor signal produced by the gap sensor, position a desired portion of the label stock at a desired location along the web path which differs from locating the forward-most portion of a label at the edge of the labelling peel blade. For example, in some labelling machines it may be desirable to position the forward-most portion of a label so that it is spaced from the edge of the labelling peel blade. In some labelling machines the forward-most portion of the label may be positioned so that it is spaced a predetermined distance before or after (with respect to the label stock transport direction) the edge of the labelling peel blade. This predetermined distance may be set by a user of the labelling machine based on the application of the labelling machine. As previously discussed, in some labelling machines the predetermined distance may be referred to as a feed distance.

It will be apparent from the foregoing description that the various features described can be used alongside one another in a single labelling machine. That is, unless the context otherwise requires, or unless explicitly stated to the contrary herein, it is envisaged that the features described can advantageously be used in a single labelling machine to realise the various benefits described herein. That said, it will also be appreciated that many of the features described herein can be used separately of one another and as such a labelling machine including one or more (but not necessarily all) of the features described herein is envisaged.

Various features of the labelling machine have been described above. In some cases, exemplary components, configurations and methods suitable for realising these particular features have been described. However in many cases the skilled person will know of other components, configurations and methods which can similarly be used to realise the particular features which are described. Many of these components, configurations and methods will be known to the skilled person from the common general knowledge. It is envisaged that such alternative components, configurations and methods can be implemented in the described embodiments without difficulty given the disclosure presented herein.

While references have been made herein to a controller or controllers it will be appreciated that control functionality described herein can be provided by one or more controllers. Such controllers can take any suitable form. For example control may be provided by one or more appropriately programmed microprocessors (having associated storage for program code, such storage including volatile and/or non volatile storage). Alternatively or additionally control may be provided by other control hardware such as, but not limited to, application specific integrated circuits (ASICs) and/or one or more appropriately configured field programmable gate arrays (FPGAs).

Where angles have been specified herein, such angles are measured in radians although modifications to use other angular measurements will be apparent to the skilled person.

While various embodiments of labelling machine(s) have been described herein, it will be appreciated that this description is in all respects illustrative, not restrictive. Various modifications will be apparent to the skilled person without departing from the spirit and scope of the invention.

The invention claimed is:

1. A gap sensor assembly for a labelling machine, the labelling machine configured to convey label stock along a web path, the gap sensor assembly comprising:
- a roller configured to guide the label stock along the web path:
- a sensor arrangement configured to produce a sensor signal which is a function of a property of a portion of label stock, wherein the sensor arrangement comprises:
  - a transmitter portion configured to produce a detection signal; and,
  - a receiver portion configured to detect the detection signal and to produce the sensor signal which is a function of a property of the label stock; and wherein
- the roller comprises the transmitter portion and/or the receiver portion.

2. A gap sensor arrangement according to claim 1, wherein the transmitter portion comprises an electromagnetic radiation source configured to produce the detection signal in the form of detection radiation, and the receiver portion comprises an electromagnetic radiation detector configured to detect the detection radiation, and
- wherein the one of the transmitter portion or the receiver portion, is spaced from the roller forming a gap between the transmitter portion and the receiver portion through which the label stock passes along the web path for detection of the property of the label stock.

3. A gap sensor arrangement according to claim 1, wherein one of the transmitter portion and the receiver portion is located inside the roller, and the other of the transmitter portion and the receiver portion is separate from the roller, and wherein the roller is transparent to the detection signal such that the detection signal can pass through the roller.

4. A gap sensor arrangement according to claim 1, wherein the transmitter portion comprises a plurality of electromagnetic radiation sources.

5. A gap sensor arrangement according to claim 4, wherein the plurality of electromagnetic radiation sources are arranged in a substantially linear formation.

6. A gap sensor arrangement according to claim 1, wherein the receiver portion comprises a plurality of electromagnetic radiation detectors.

7. A gap sensor arrangement according to claim 6, wherein the plurality of electromagnetic radiation detectors are arranged in a substantially linear formation.

8. A gap sensor arrangement according to claim 6, wherein each radiation source and each radiation detector form a sensor pair.

9. A gap sensor arrangement according to claim 2, wherein the property of a portion of label stock is the electromagnetic transmittance of the portion of label stock.

10. A gap sensor arrangement according to claim 1, wherein the portion of the label stock comprises the web and attached labels.

11. A gap sensor arrangement according to claim 1 wherein the detection signal is infrared radiation.

12. A labelling machine comprising:
- a gap sensor arrangement,
- a supply spool support for supporting a supply spool comprising label stock comprising a web and a plurality of spaced labels attached to the web and which are separable from the web:
- a take-up spool support adapted to take up a portion of web;
- a motive apparatus configured to propel the web along a web path from the supply spool support to the take-up spool support;
- a controller; and
- wherein the sensor arrangement is configured to produce a sensor signal which is a function of a property of a portion of the label stock at a plurality of positions spaced from one another in a direction non-parallel to the web path.

13. A labelling machine according to claim 12, wherein the controller is configured to control the motive apparatus based upon a change in the sensor signal in order to position a target portion of the label stock at a desired location along the web path.

14. A labelling machine according to claim 13, wherein the target portion of the label stock is a leading edge of a label and the desired location along the web path is an edge of a labelling peel plate configured to separate a label from the label web when the label stock passes the labelling peel plate.

15. A labelling machine according to claim 12, wherein the controller is configured to detect a feature of the label stock based upon a change in the sensor signal.

16. A labelling machine according to claim 15, wherein the feature of the label stock is selected from the group consisting of: a length of a portion of the label stock, the presence of a label of the label stock, the absence of a label of the label stock, the leading edge of a label of the label stock and the trailing edge of a label of the label stock.

17. A labelling machine according to claim 16, wherein the feature of the label stock is a length of a portion of the label stock and the length of the portion of the label stock is selected from the group consisting of a length of a label, a pitch length between adjacent labels and a gap length between adjacent labels.

18. A labelling machine according to claim 12, wherein the motive apparatus comprises a motor configured to rotate the take-up spool support.

19. A labelling machine according to claim 12, arranged to apply pre-printed labels to packages in a product packaging facility.

20. A labelling machine according to claim 12, further comprising a printer arranged to print onto labels of the label web.

21. A labelling machine according to claim 12, wherein said plurality of positions are spaced from one another in a direction substantially perpendicular to the web path.

* * * * *